United States Patent
Bhela et al.

(10) Patent No.: US 7,224,987 B1
(45) Date of Patent: May 29, 2007

(54) SYSTEM AND METHOD FOR CONTROLLING ACCESS TO LOCATION INFORMATION

(75) Inventors: Harvinder S. Bhela, Woodinville, WA (US); Stephen L. Lawler, Redmond, WA (US); Rajesh M. Rao, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 920 days.

(21) Appl. No.: 10/184,136

(22) Filed: Jun. 27, 2002

(51) Int. Cl.
H04Q 7/20 (2006.01)

(52) U.S. Cl. .............. 455/456.3; 455/456.1; 455/456.2

(58) Field of Classification Search .......... 455/456.1, 455/456.2, 456.5, 414.3, 456.3, 418; 701/200; 709/200, 246
See application file for complete search history.

(56) References Cited

U.S. PATENT DOCUMENTS

| | | | |
|---|---|---|---|
| 5,890,070 A | 3/1999 | Hamada | |
| 6,091,956 A * | 7/2000 | Hollenberg | 455/456.5 |
| 6,094,164 A | 7/2000 | Murphy | |
| 6,374,177 B1 * | 4/2002 | Lee et al. | 701/200 |
| 6,489,893 B1 | 12/2002 | Richards et al. | |
| 6,522,875 B1 * | 2/2003 | Dowling et al. | 455/414.3 |
| 6,628,928 B1 * | 9/2003 | Crosby et al. | 455/77 |
| 6,741,853 B1 * | 5/2004 | Jiang et al. | 455/418 |
| 6,784,809 B2 | 8/2004 | Flick | |
| 6,813,501 B2 * | 11/2004 | Kinnunen et al. | 455/456.2 |
| 6,853,848 B2 * | 2/2005 | Sahinoglu | 455/456.1 |
| 6,873,258 B2 * | 3/2005 | Marples et al. | 455/456.1 |
| 6,898,434 B2 * | 5/2005 | Pradhan et al. | 455/456.1 |
| 6,909,903 B2 * | 6/2005 | Wang | 455/456.1 |
| 6,925,481 B2 * | 8/2005 | Singhal et al. | 709/200 |
| 6,944,679 B2 * | 9/2005 | Parupudi et al. | 709/246 |
| 2001/0055975 A1 | 12/2001 | McDonnell et al. | |
| 2002/0080968 A1 | 6/2002 | Olsson | |
| 2003/0035544 A1 | 2/2003 | Herle et al. | |
| 2003/0109988 A1 | 6/2003 | Geisler et al. | |
| 2003/0186710 A1 * | 10/2003 | Muhonen et al. | 455/456.5 |
| 2004/0171380 A1 | 9/2004 | Puranik et al. | |
| 2004/0180668 A1 | 9/2004 | Owens et al. | |

FOREIGN PATENT DOCUMENTS

| | | |
|---|---|---|
| WO | WO 98/52379 A1 | 11/1998 |
| WO | WO03/065754 A1 * | 8/2003 |

OTHER PUBLICATIONS

Cheverst, K., et al., "Providing Tailored (Context-Aware) Information to City Visitors," *Adaptive Hypermedia and Adaptive Web-Based Systems*, International Conference, AH 2000, Trento, Italy, Aug. 28-30, 2000, Proceedings, pp. 73-85.

(Continued)

*Primary Examiner*—Salvatore Cangialosi
(74) *Attorney, Agent, or Firm*—Christensen O'Connor Johnson Kindness PLLC

(57) ABSTRACT

A system and method for providing location information associated with a location owner to location consumers. A location server includes an owner profile for controlling access to the owner's location information. The owner profile contains information describing a user-defined geographic area. In response to a location consumer requesting the location owner's location information, the location server obtains data describing a current location of the location owner. The server determines if the current location falls within a set of boundaries that defines the user-defined geographic area. If the current location falls within a set of boundaries that defines the user-defined geographic area, the location server transmits the location information to the requesting location consumer.

29 Claims, 14 Drawing Sheets

OTHER PUBLICATIONS

Dogac, A., and A. Tumer, "Issues in Mobile Electronic Commerce," *Journal of Database Management*, vol. 13, No. 1, Jan.-Mar. 2002, pp. 36-42.

Marmasse, N., and C. Schmandt, "Location-Aware Information Delivery with *ComMotion,*" *Handheld and Ubiquitous Computing*, Second International Symposium, HUC 2000, Bristol, UK, Sep. 25-27, 2000, Proceedings, pp. 157-171.

Oppermann, R., and M. Specht, "A Context-Sensitive Nomadic Exhibition Guide," *Handheld and Ubiquitous Computing*, Second International Symposium, HUC 2000, Bristol, UK, Sep. 25-27, 2000, Proceedings, pp. 127-142.

\* cited by examiner

SYSTEM AND METHOD FOR CONTROLLING ACCESS TO LOCATION INFORMATION

FIELD OF THE INVENTION

This invention relates to computer software and communication networks, and more particularly, the invention relates to a system and method for providing personal location information to third parties.

BACKGROUND OF THE INVENTION

In an information age, remaining connected to information at all times is extremely important. People use many devices and services to stay connected to information and to other people, such as cell phones, pagers, personal digital assistants (PDAs), and laptop computers. A by-product of this connectivity is the tremendous amount of personal information that is generated, or known, concerning each 'user.' This personal information covers a broad spectrum of categories, such as credit information, phone numbers, and addresses to name just a few.

Personal information, in general, is becoming more and more valuable. In order to be more effective with their marketing efforts, merchants are willing to pay large amounts of money to find out very personalized information about individuals. On the other hand, personal information is also extremely important to control. For many important personal reasons, individuals generally do not want their personal information disclosed, including information the service providers possess. However, individuals may be willing to allow some personal information to be distributed to others, including merchants, if the individuals can control the type and amount of information distributed, and possibly receive some value in exchange for that information. For example, a person may be willing disclose his or her whereabouts in exchange for valuable opportunities, such as a special sale or discount with a merchant.

One area of personal information that is increasingly useful, important, and valuable is a person's physical location. Automated guidance and global location services depend upon identifying a person's, or a thing's, location. Fleet management can greatly benefit from monitoring the physical location of a fleet of vehicles. Merchants make use of a person's location, offering specials to those who are in a certain area. As mentioned above, some merchants are willing to pay for such information. Alternatively, it may be nice to locate one's friends in order to determine a convenient gathering location. As can be seen, there are many times that it is advantageous for a person to disclose the person's physical location.

Many devices or services are capable of generating or collecting location information. For example, wireless telephone services are able to locate a person by sensing the presence of a person's wireless telephone in a particular coverage area, or cell. Similarly, a wireless network service is able to locate a person by sensing the presence of the person's computing device with a range of wireless gateways, such as an IEEE 802.11(b) or Bluetooth enabled network. In both of these examples, the service senses the location of a broadcasting device and therefore knows that the device is within a certain area. In another embodiment, global positioning system ("GPS") devices utilize geosynchronous satellite signals to calculate a person's position, which can be displayed to the person.

Electronic calendars and e-mail applications can also generate location information. For example, a person may enter an appointment in an electronic calendar that specifies location information. Additionally, an email message may include statements such as, "I'm at work," that corresponds to location information. Clearly, there are many ways which devices, or services, or both, can generate information about a person's location.

Although there are a number of ways to obtain location information, most location information generating systems are closed, meaning that the location information is used only within the system, if the location information is used at all. For example, wireless devices typically use location information to obtain wireless service. Current location information is displayed by a GPS device to the person operating the device. Both of these closed location information generating system examples are not well-suited to allow a "located" person to exploit the value of that location information by providing it to others outside of the system. In general, typical location information generating systems do not allow a "located" person to distribute the location information to third parties, and/or permit the "located" person to control the distribution of the location information to the third parties.

Rather than a single device or service, a person may be associated with multiple sources of location information. For example, a person may have a wireless telephone, a computing device running an electronic calendar and e-mail, and a GPS device. All of these devices and services are able to generate location information for that person with differing degrees of accuracy. However, in the past, no mechanism for collecting and/or processing the various sources of location information to provide a person's location information when a request for the persons location is made.

In addition to the above-described shortcomings, most existing location information generating systems do not provide individuals with adequate resources for controlling the way third-party entities access the individual's location information. For example, when a location owner provides access to their location information, the location information may be indiscriminately received by any person, computer, or third-party entity having access to the system. As a result, most existing location information generating systems cannot readily meet the privacy needs of location information owners.

Existing systems that allow uncontrolled access to an owner's location information also present other disadvantages. For instance, uncontrolled access of an owner's location information does not allow the owner to provide different types of access to different recipients of the location information. In addition, uncontrolled access of an owner's location information does not allow the owner to automatically restrict others from receiving their location information by the use of other criteria. A need for such restriction capabilities may arise in a number of situations where a location owner has different reasons for sharing his or her location information with different individuals. For example, an employee may only want to share his or her location information with other colleagues if he or she is located near the employer's building. However, at the same time, the same employee may want to share his or her location information with family members regardless of his or her current location. To date, existing systems fail to provide location owners with the ability to restrict different individuals from accessing the owner's location information based on his or her current location.

What is needed is an improved location information generating system that provides controlled access to a person's location information. More specifically, there is a need for a location information generating system that allows a location owner to control the way different individuals access to the owner's location information depending on the current location of the location owner.

SUMMARY OF THE INVENTION

The present invention is directed to providing a system, method and computer-readable medium for providing controlled access to location information associated with an owner of the location information. More specifically, the present invention provides a method and system that allows a location owner to control the access of the owner's location information so that specific individuals can receive the location information only if the owner's current location is within a specific geographic area.

In accordance with the invention, a location consumer submits a request to a location server to retrieve location information associated with a location owner. In response to the receipt of the request for the owner's location information, the location server obtains information describing the current location of the location owner. The server then examines an owner profile associated with the location owner and determines if the requesting consumer is authorized to access the information describing the current location of the location owner. The requesting consumer is authorized to receive the owner's location information only if the owner's current location is within a geographic area where the owner desires to share his or her location information. If the server determines that the owner's current location is within the owner-defined geographic area (also referred to herein as a "selected geographic area"), the location server transmits the location information to the requesting location consumer.

In accordance with the invention, a selected geographic area can be any area or region defined by the user. For instance, the selected geographic area may include, but is not limited to, any predefined region such as those that are defined by a telephone number area code, zip code, city, county or state boarder, or the like. Alternatively, the selected geographic area can be a custom or user-defined region such as an office campus, shopping district, local neighborhood, or any other geographic region defined by the location owner or any other entity. In addition, the selected geographic area may be any combination of the above-described regions or areas. Further, the selected geographic area can be any area, except for a specific area, such as the user's home, an office campus, etc.

As will be readily appreciated from the foregoing summary, processing location information according to an owner profile allows a location owner to selectively control the availability of his or her location information to individual location consumers in different ways. For example, the owner profile may be configured to authorize a requesting location consumer, such as an employer, to access the owner's location information only if the owner is at work. At the same time, the owner profile may provide unlimited access to a select group of location consumers regardless of the geographic location of the owner.

A system formed in accordance with the present invention preferably obtains and stores an owner profile that controls the availability of an owner's location information in a location server. Preferably, the server includes an administrative module for allowing a location owner to configure the owner profile. In this exemplary embodiment of the invention, the administrative module allows the location owner to configure privacy information in the owner profile such that the owner's location information can be accessed by specific location consumers only if the location information coincides with a selected geographic area defined by the owner. Preferably, the format of the owner profile allows the location owner to associate one or more selected geographic areas with individual location consumers or groups of location consumers. Such formatting provides a clear indication when the individuals or groups can access the location information.

A computer-readable medium formed in accordance with the invention includes computer-executable components for providing an owner's location information to a location consumer. Preferably, the computer-executable components comprise a core services module, an owner profile database, and a location provider module. The core services module processes the request according to the owner profile. More specifically, the owner profile database is communicatively coupled to the core services module and shares the owner profile to the core services module. The location provider module is communicatively coupled to the core services module and obtains information about the location of the location owner from a location provider. The core services module processes the location owner's location information according to the owner profile. The core services module determines whether the location consumer is authorized to access the location owner's location information by the use of at least one user-defined selected geographic area where the location owner desires to share his or her location information. If it is determined that the location consumer is authorized to receive the location information, the core services module then transmits the processed location information to the location consumer.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

Figure 1:
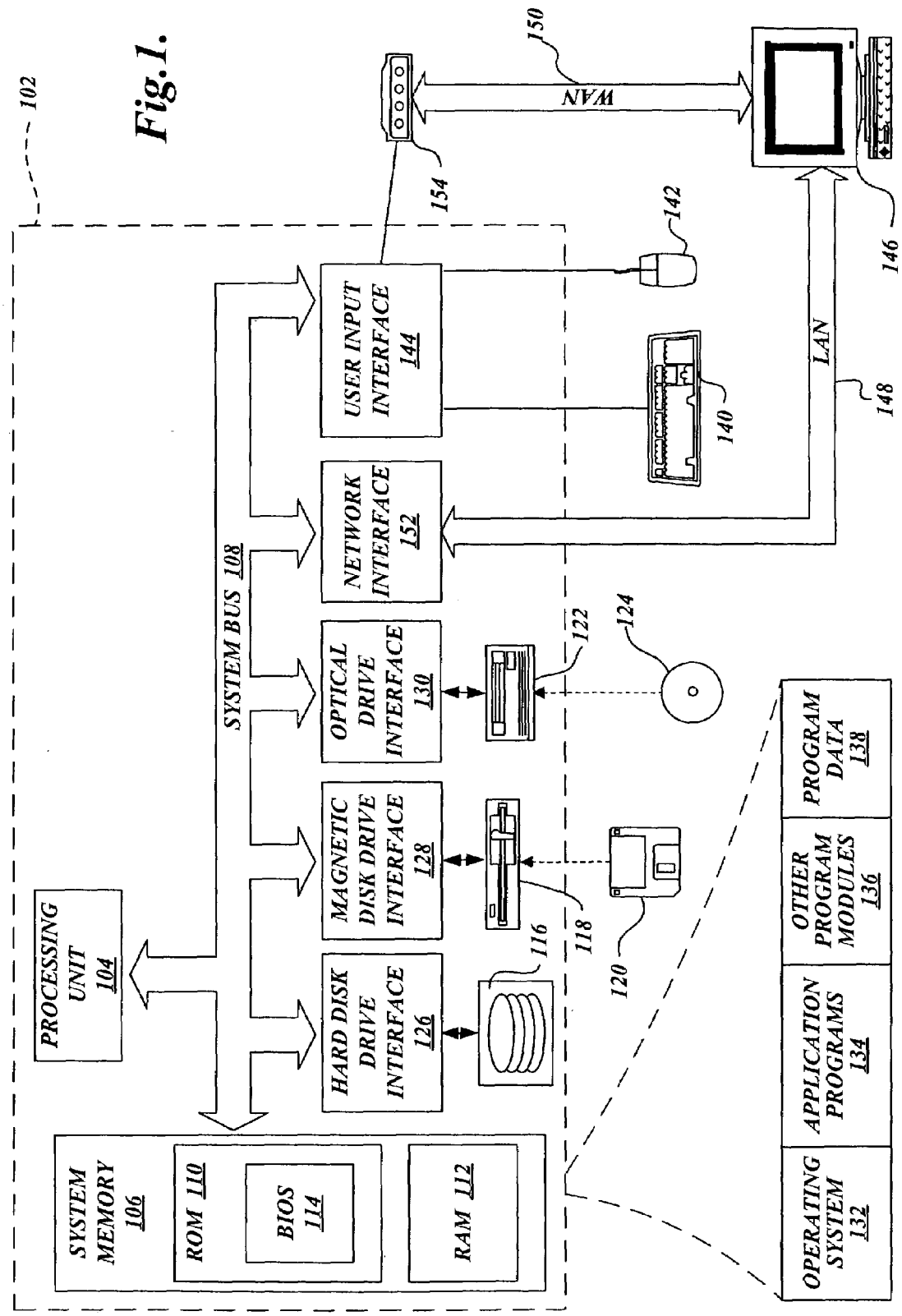
FIG. 1 is a block diagram of a computer system suitable for providing an exemplary operating environment for the present invention.

FIG. 1 and the following discussion are intended to provide a brief, general description of a computing system suitable for implementing various features of the invention. While the computing system will be described in the general context of a personal computer usable in a distributed computing environment, where complimentary tasks are performed by remote computing devices linked together through a communications network, those skilled in the art will appreciate that the invention may be practiced with many other computer system configurations, including hand-held devices, multiprocessor systems, microprocessor-based or programmable consumer electronics, minicomputers, mainframe computers, and the like. The invention may be practiced in a local area network, or alternatively, on a single computer using logical, rather than physically remote, devices. Additionally, while the invention will be described in terms of application programs that run on an operating system in conjunction with a personal computer, those skilled in the art will recognize that the invention also may be implemented in combination with other program modules. Generally, program modules include routines, programs, components, data structures, etc. that perform particular tasks or implement particular abstract data types.

With reference to FIG. 1, an exemplary system for implementing the invention includes a conventional personal computer 102, including a processing unit 104, a system memory 106, and a system bus 108 that couples the system memory to the processing unit 104. The system memory 106 includes read only memory (ROM) 110 and random access memory (RAM) 112. A basic input/output system 114 (BIOS), containing the basic routines that help to transfer information between elements within the personal computer 102, such as during start-up, is stored in ROM 110. The personal computer 102 further includes a hard disk drive 116, a magnetic disk drive 118, e.g., to read from or write to a removable disk 120, and an optical disk drive 122, e.g., for reading a CD-ROM disk 124 or to read from or write to other optical media. The hard disk drive 116, magnetic disk drive 118, and optical disk drive 122 are connected to the system bus 108 by a hard disk drive interface 126, a magnetic disk drive interface 128, and an optical drive interface 130, respectively. The drives and their associated computer-readable media provide nonvolatile storage for the personal computer 102. Although the description of computer-readable media above refers to a hard disk, a removable magnetic disk and a CD-ROM disk, it should be appreciated by those skilled in the art that other types of media which are readable by a computer, such as magnetic cassettes, flash memory cards, digital video disks, Bernoulli cartridges, ZIP disks, and the like, may also be used in the exemplary operating environment.

A number of program modules may be stored in the drives and RAM 112, including an operating system 132, one or more application programs 134, other program modules 136, and program data 138. A user may enter commands and information into the personal computer 102 through input devices such as a keyboard 140 or a mouse 142. Other input devices (not shown) may include a microphone, touch pad, joystick, game pad, satellite dish, scanner, or the like. These and other input devices are often connected to the processing unit 104 through a user input interface 144 that is coupled to the system bus, but may be connected by other interfaces (not shown), such as a game port or a universal serial bus (USB). A monitor (not shown) or other type of display device is also connected to the system bus 108 via an interface, such as a video adapter (not shown). In addition to the monitor, personal computers typically include other peripheral output devices (not shown), such as speakers or printers.

The personal computer 102 may operate in a networked environment using logical connections to one or more remote computers, such as a remote computer 146. The remote computer 146 may be a server, a router, a peer device or other common network node, and typically includes many or all of the elements described relative to the personal computer 102. The logical connections depicted in FIG. 1 include a local area network (LAN) 148 and a wide area network (WAN) 150. Such networking environments are commonplace in offices, enterprise-wide computer networks, Intranets and the Internet.

When used in a LAN networking environment, the personal computer 102 is connected to the LAN 148 through a network interface 152. When used in a WAN networking environment, the personal computer 102 typically includes a modem 154 or other means for establishing communications over the WAN 150, such as the Internet. The modem 154, which may be internal or external, is connected to the system bus 108 via the user input interface 144. In a networked environment, program modules depicted relative to the personal computer 102, or portions thereof, may be stored in the remote memory storage device. It will be appreciated that the network connections shown are exemplary and other means of establishing a communications link between the computers may be used.

Figure 2:
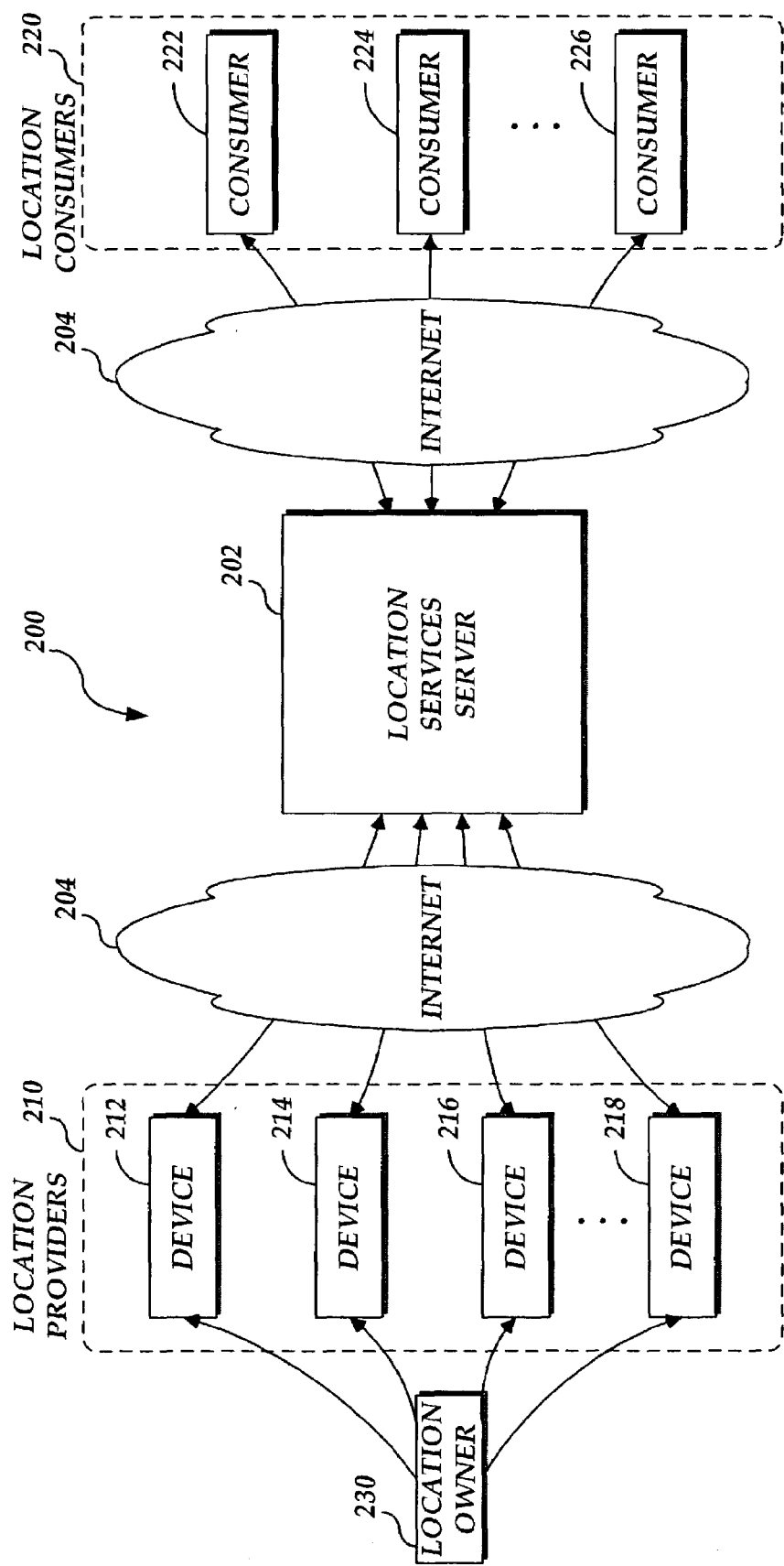
FIG. 2 is a block diagram illustrating an exemplary location service network environment suitable for implementing the present invention.

FIG. 2 is a block diagram illustrating an exemplary location service network environment 200 suitable for implementing the present invention. The location service network 200 can include a location services server 202, a network, such as the Internet 204, location providers 210 including location devices 212–218, and location consumers 220 including consumers 222–226. The location providers 210 generate location information corresponding to the location of the location owner 230. The location providers 210 can include devices such as wireless telephones, PDAs, GPSs, network connections in wireless networks and LANs, personal electronic calendars, specially equipped automobiles, and other devices operable to generate location information. Location providers 210 also includes direct owner information submittals. Frequently, these devices, or location providers, operate through service providers (not shown). In such cases, it may actually be the service providers that generate the location information for the location services server 202.

In an illustrative embodiment of the present invention, the location providers 210 may be characterized by communication classifications: single/multiple, and push/pull. A single/multiple classification refers to whether a location provider submits information for one, or multiple location owners. For example, a wireless telephone service will typically provide information for multiple persons, and would therefore be classified as a multiple location provider. On the other hand, a person's PDA will usually provide information for just the person, and would be single location provider. A push/pull classification, refers to whether a location provider "pushes" location information to the location services server 202 on its own, i.e., without receiving a query for the information, or whether the location provider must be queried, or "pulled," for information before it will provide the location information. In addition to the classifications listed, one skilled in the art will recognize that additional or alternative classifications may also be utilized.

In accordance with the present invention, a location provider's classification in one category may influence its classification in another category. As an example, those location providers 210 classified as multiple location providers are often also classified as push location providers. Wireless telephone services may be an example of a multiple/push location provider. This is primarily because multiple location providers could be easily overwhelmed with individual requests for location information if they did not control the flow of location information to the location services server 202 in a rational manner. Thus, according to one embodiment of the present invention, when dealing with multiple/push location providers, the locations services server 202 provides the location providers 210 the names of locations owners, such as location owner 230, for which the location provider is to "push" location information to the location services server 202.

As shown in FIG. 2, according to one aspect of the present invention, the location providers 210 communicate with the location services server 202 which may take the form of a personal computer 102 of the type shown in FIG. 1, through the Internet 204. One skilled in the art will appreciate that other channels of communication between the location providers 210 and the location services server 202 are possible. As an example, the location providers may communicate with the location services server through local area networks, or direct communication such as land-based lines or wireless telephone connections. Thus, while FIG. 2 illustrates that the location providers 210 communicate with the location services server 202 through the Internet 204, it is for illustrative purposes only, and not intended to be a limitation on the present invention.

The location consumers 220 are those persons, or entities, that query the location services server 202 for location information concerning a location owner, such as location owner 230. The location consumers may include a spouse, friends, employers, and merchants. The location consumers 220 submit requests to the location services server 202 in order to obtain location information corresponding to a location owner. FIG. 2 illustrates that these location consumers 220 communicate with a location services server 202 through the Internet 204. One skilled in the art will recognize that the location consumers 220 may communicate with a location services server 202 through other communication means not illustrated in FIG. 2. For example, the location consumers 220 may communicate with the location services server 202 through direct landlines or wireless communication devices. Thus, while FIG. 2 illustrates that the location consumers 220 communicate with the location services server 202 through the Internet 204, is for illustration purposes only, and not intended to limit the manner in which location consumers 220 may communicate with the location services server 202.

Figure 3:
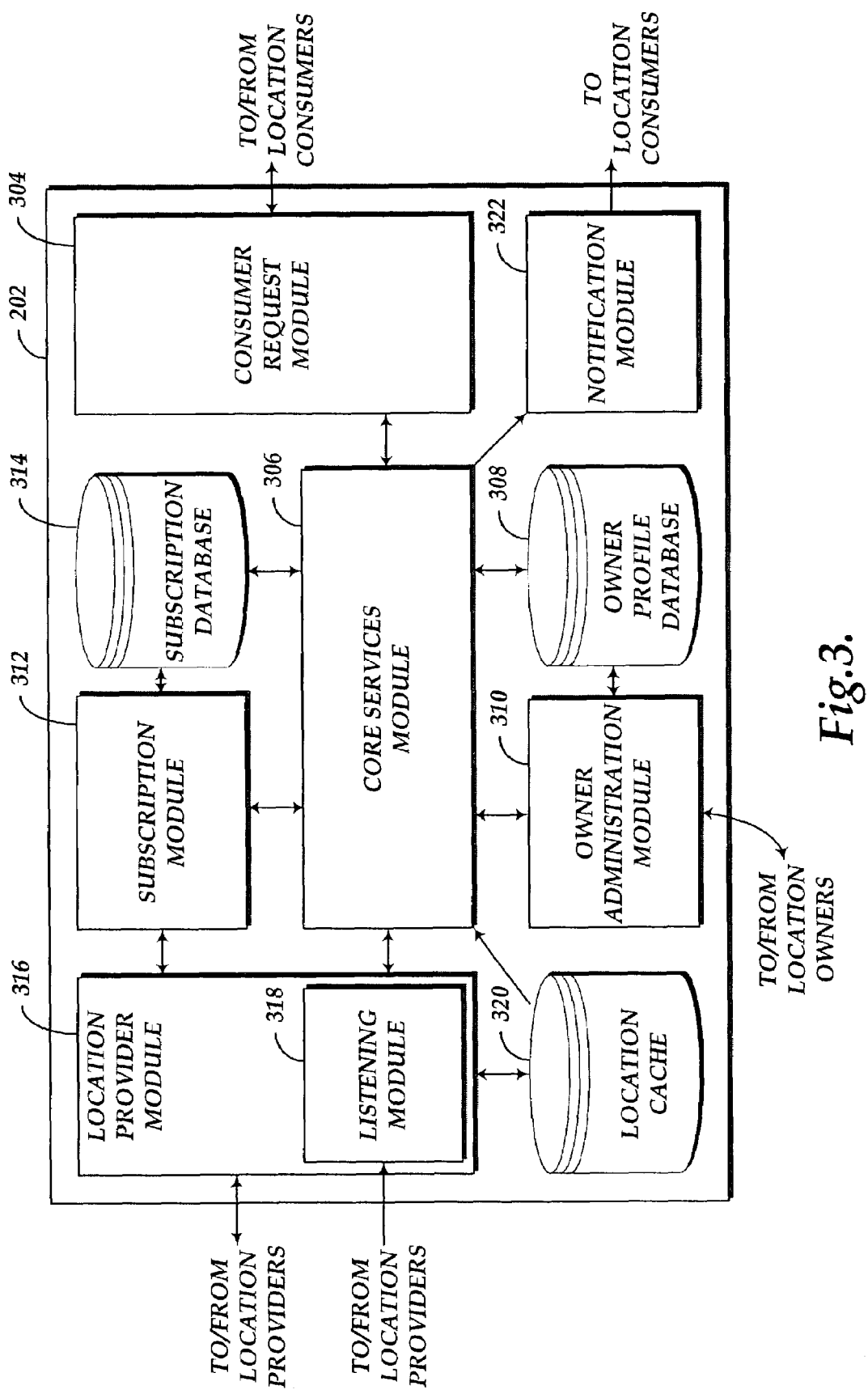
FIG. 3 is a block diagram illustrating an exemplary embodiment of logical components and relationships within a location services server.

FIG. 3 is a block diagram illustrating an exemplary embodiment of logical components and relationships within a location services server 202 (FIG. 2.) According to one aspect of the present invention, the location services server 202 includes a consumer request module 304 to obtain location requests from location consumers 220 for location information. Depending on the type of requests received from the location consumers 220, such as whether the request is a synchronous, asynchronous, or subscription request, the consumer request module 304 may also be the channel through which the location services server 202 transmits the location information to the location consumer 220. The consumer request module 304 internally communicates received requests to a core services module 306. Other functions of the location services server 202 are described in greater detail in commonly assigned and co-pending U.S. application Ser. No. 10/184,138, filed on Jun. 27, 2002 and entitled "SYSTEM AND METHOD FOR PROVIDING PERSONAL LOCATION INFORMATION TO LOCATION CONSUMERS FROM A LOCATION SERVICES SERVER," the subject matter of which is specifically incorporated herein by reference.

According to one aspect of the present invention, the core services module 306 acts as the general processing module for the location services server 202. The core services module 306 takes care of many duties, such as authenticating and authorizing location consumers, and filtering location information according to privacy information provided by a location owner in response to an information request. In accordance with an aspect of the present invention, privacy information may include: an access control list describing location consumers authorized to view the information; granularity of the location information where some location consumers are given more or less diffuse location information; and restrictions on a location consumer to particular location providers. The privacy information may also include certain time restrictions. The privacy information may also include certain geographic based restrictions. Those skilled in the art will appreciate that privacy information can include additional or alternative information not described here, but which fall within the scope of the present invention.

In accordance with the invention, the privacy information may include control parameters that allows a location owner 230 to selectively restrict access to their location information based on the actual location of the location owner 230. In one illustrative example, an employee of a particular company may allow his or her location information to be accessed by a supervisor only if the employee is located on the employer's premises. At the same time, the employee may provide unlimited access to his or her location information to family members. The invention allows a location owner 230 to control such access to his or her location information.

In the illustrated embodiment of the invention, the core service module 306 is configured to restrict the distribution of a location owner's location information based on restriction parameters established by a location owner. One type of restriction parameter controlling the distribution of and/or access to an owner's location information based on the current location of the location owner. This restriction parameter allows a location owner to define and select a geographic area where he or she desires to share location information with location consumers. In accordance with one aspect of the present invention, a selected geographic area may include, but is not limited to, any area or region defined by the user. For instance, the selected geographic area can be any predefined region such as those defined by a telephone area code, a zip code, or a city, county or state boarder, etc. The selected geographic area can also be a custom or user-defined region such as an office campus, shopping district, neighborhood, or any other geographic region defined by the location owner or any other operator. Or, the selected geographic area can be any area except for a specific geographic area, such as an office campus. In addition, the selected geographic area may be any combination of the above-described regions or areas. In addition to having the ability to define a selected geographic area, the location owner may associate unique selected geographic areas with individual location consumers. Thus, embodiments of the present invention can be configured to provide controlled access to different consumers with varying levels of access capabilities.

The restriction parameters may also be time-based. Additional information related to the time-based restriction features is described in greater detail in commonly assigned and co-pending U.S. application Ser. No. 10/184,467, filed on Jun. 27, 2002, entitled "SYSTEM AND METHOD FOR CONTROLLING ACCESS TO LOCATION INFORMATION," the subject matter of which is specifically incorporated herein by reference.

Geographic and time-based restrictions can be combined in actual embodiments of the invention, if desired, such that a location consumer will only be provided with an owner's location information if the location owner is within (or without) a prescribed geographic area when a location request is received that falls within the time-based restriction parameters contained in the owner profile associated with the requesting location consumer. Although the above examples include specific examples of different types of privacy information, those skilled in the art will appreciate that privacy information can include additional or alternative information not described here, but which fall within the scope of the present invention.

In the illustrated embodiment of the present invention, location owners enter their owner profile information, including the time and/or geographic information described above, as well as any other privacy information, through an owner administration module 310. The owner profile information is stored by the owner administration module 310 in an owner profile database 308. The owner profile stored in the owner profile database 308 allows the core services module 306 to restrict the location information requested by a location consumer according to the location owner's specifications.

In accordance with the invention, an owner's privacy information, such as the data that defines the selected geographic area, can be stored in the owner profile database 308. As will be readily appreciated by one of ordinary skill in the art, the format of the data that defines the selected geographic area, which is stored in the owner profile database 308, can take a variety of forms. The use of any suitable known database format allows the data that defines the selected geographic area to be accessed by the core services module 306 when determining the access authorization for a location consumer. Preferably, the format allows the location owner to associate one or more selected geographic areas with individual location consumers or groups of location consumers to indicate when the individuals or groups can access the location information. In addition, preferably, the chosen database format will allow the location owner 230 to enter and manage the data that defines the selected geographic area by the use of an interface provided, for example, by the owner administration module 310.

Although the illustrated embodiments of the invention utilize an owner profile database 308, owner administration module 310 and a core services module 306 to control and access the data that defines the selected geographic area, those skilled in the art will appreciate that there are many ways in which a location owner can authorize or restrict authorization to location consumers. Thus, the herein-described embodiments of the invention should be construed as illustrative and not limiting. For instance, the data that defines the selected geographic area, can be stored in and accessed from in other databases such as the subscription database 314 described below, or any other like storage device.

The core services module 306 may also interact with a subscription module 312 and a subscription database 314 when the location request, received at the consumer request module 304, is a subscription request. In the illustrated embodiment of the present invention, a subscription request indicates that the location consumer wishes to be notified of events relating to one or more location owners. In an alternative embodiment, a subscription request may identify only one location owner. The subscription request may identify a number of subscribed events, including, but not limited to, changes in location, entering or leaving a particular geographic region, or the expiration of a time interval. Information necessary for the subscription module 312 to process the subscription request is stored in the subscription database 314.

In accordance with an embodiment of the present invention, the subscription module 312 is responsible for processing and monitoring events related to the subscription requests. When the subscription module 312 detects a subscribed event relating to a location owner, the subscription module 312 sends appropriate location information to the core services module 306. The subscription module 312 also interacts with a location provider module 316 (described below) to initiate a subscribed event, or alternatively, to notify location providers of the subscribed event.

The core services module 306 processes the location information according to the privacy restrictions discussed above, and sends the processed location information to a notification module 322 to notify the location consumer. In the illustrated embodiment, the notification module 322 transmits the location information to the location consumer. Alternatively, the notification module 322 may also utilize an external notification server. Thus, the notification module 322 performs the function of a notification facilitator. Those skilled in the art will recognize that there are many ways that may be utilized to provide notification to a location consumer that fall within the scope of the present invention. Thus, these examples should be construed as exemplary and not limiting.

The location provider module 316 interacts with one or more location providers 210. The location provider module 316 sends requests to the location providers 210 indicating that a location owner will be monitored, or that location information pertaining to a particular location owner has been requested. According to one embodiment of the present invention, the location provider module 316 may synchronously request and receive location information from a location provider 210. According to another embodiment, the location provider module 316 includes a listening module 318 that listens for location information automatically generated by one or more push-type location providers 210, or by location providers that respond asynchronously to an information request. The listening module 318 receives location information from location providers 210 and supplies the received location information to the location provider module 316. In an alternative embodiment (not shown), the listening module 318 is a peer to the location provider module 316 and maintains connections to other components of the locations services server 202. In yet another alternative embodiment (also not shown), the tasks of the listening module 318 are integrated into the location provider module 316.

The listening module 318 may store received location information in a location cache 320 until it is needed, either by the subscription module 312, to monitor for a particular event, or the core services module 306, to respond to a particular location request. Storing location information in the location cache 320 is especially useful when the intervals between when push-type location providers 210 transmit subscribed location information do not correspond to the intervals specified in a subscription request. According to the embodiment shown in FIG. 3, both the location provider module 316 and the core services module 306 are able to directly access the location cache 320 in order to obtain location information. The subscription module 312 has indirect access. Alternatively, the subscription module 312 may also have directly access location information stored in the location cache 320.

FIG. 3 illustrates various logical components and relationships designed to make the present invention more easily understood. The illustrated logical components and relationships are for illustration purposes only, and not meant to be interpreted as limitations on the present invention. Those skilled in the art will appreciate that the present invention may be embodied in a variety of configurations, including configurations that comprise components other than those illustrated in FIG. 3 and described above, without departing from the scope of the invention.

Figure 4:
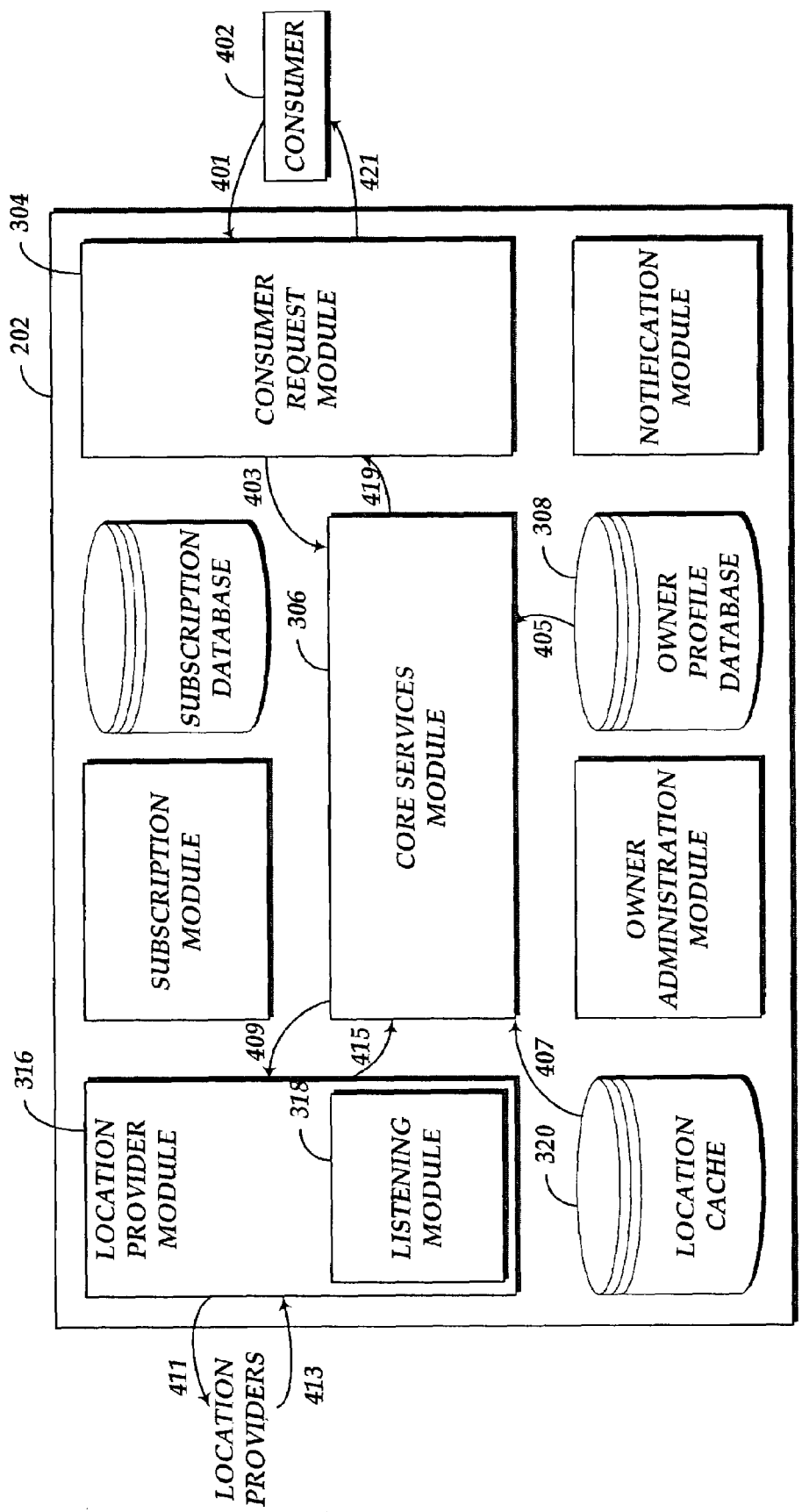
FIG. 4 is a block diagram of the logical components of the location services server of FIG. 3 illustrating an exemplary processing of a synchronous location request from a location consumer.

FIG. 4 is a block diagram of the logical components of the location services server 202 of FIG. 3 showing how the logical components process a synchronous location request from a location consumer 220. Those skilled in the art will recognize, when making a synchronous location request, the location consumer expects an immediate response from the location services server 202. For a synchronous request, the conduit through which the location request is made is also the conduit for returning the response.

FIG. 4 illustrates a location consumer 402 making a synchronous location request on the location services server 202, as indicated by arrow 401. The consumer request module 304 of the location services server 202 receives this location request. A location request will typically specify a location owner and other information necessary in order to process the location request, including, but not limited to, a specific location provider, passwords, user identification, and the like. Additionally, if the location request is an asynchronous request, the request will also typically include information for notifying the location consumer 402 when the request is completed.

The consumer request module 304 transfers the location request to the core services module 306, as indicated by arrow 403. The core services module 306 conducts an authentication and an authorization process on the location consumer 402 to verify that the location consumer is permitted to access information from the location services server 202. Assuming that the location consumer 402 is properly authenticated and authorized, the core services module 306 identifies the location owner in the location request and retrieves owner profile information from the owner profile database 308, as indicated by arrow 405. The core services module 306 then determines, using the owner profile information, whether the location consumer 402 may access location information for the specified location owner, what, if any, filters to apply, and any restrictions on the location information The owner profile information also includes location provider information. In one embodiment of the present invention, the location provider information identifies all location providers that generate information about the location of the location owner. Because some location information pertaining to the location owner may already be cached in the location cache 320, the core services module 306 queries the location cache, as designated by arrow 407, for any relevant information. For location information not found in the location cache 320, the core services module 306 submits location request information, including any location providers to be queried, to the location provider module 316, as designated by arrow 409. The location provider module 316 issues location information queries to all of the specified location providers, according to specifics previously established between the locations services server 202 and the location provider, as indicated by arrow 411. The location provider module 316 may receive some responses from location providers synchronously, while other will be received asynchronously through the listening module 318.

After all responses have been received, as designated by arrow 413, the location provider module 316 sends the information obtained from the location providers to the core services module 306, designated by arrow 415. According to one embodiment of the present invention, in order to avoid a blocking condition if one of the information providers fails to timely respond, the location provider module 316 may limit the amount of time it waits for responses, and return an incomplete response to the core services module 306. Once the location information is retrieved from the location providers, the core services module 306 generates a current location for the location owner according to any privacy restrictions the information owner may have indicated. Finally, the core services module 306 returns the generated location to the consumer request module 304, shown by arrow 419, which in turn returns the location to the location consumer 402, as designated by arrow 421.

Figure 5:
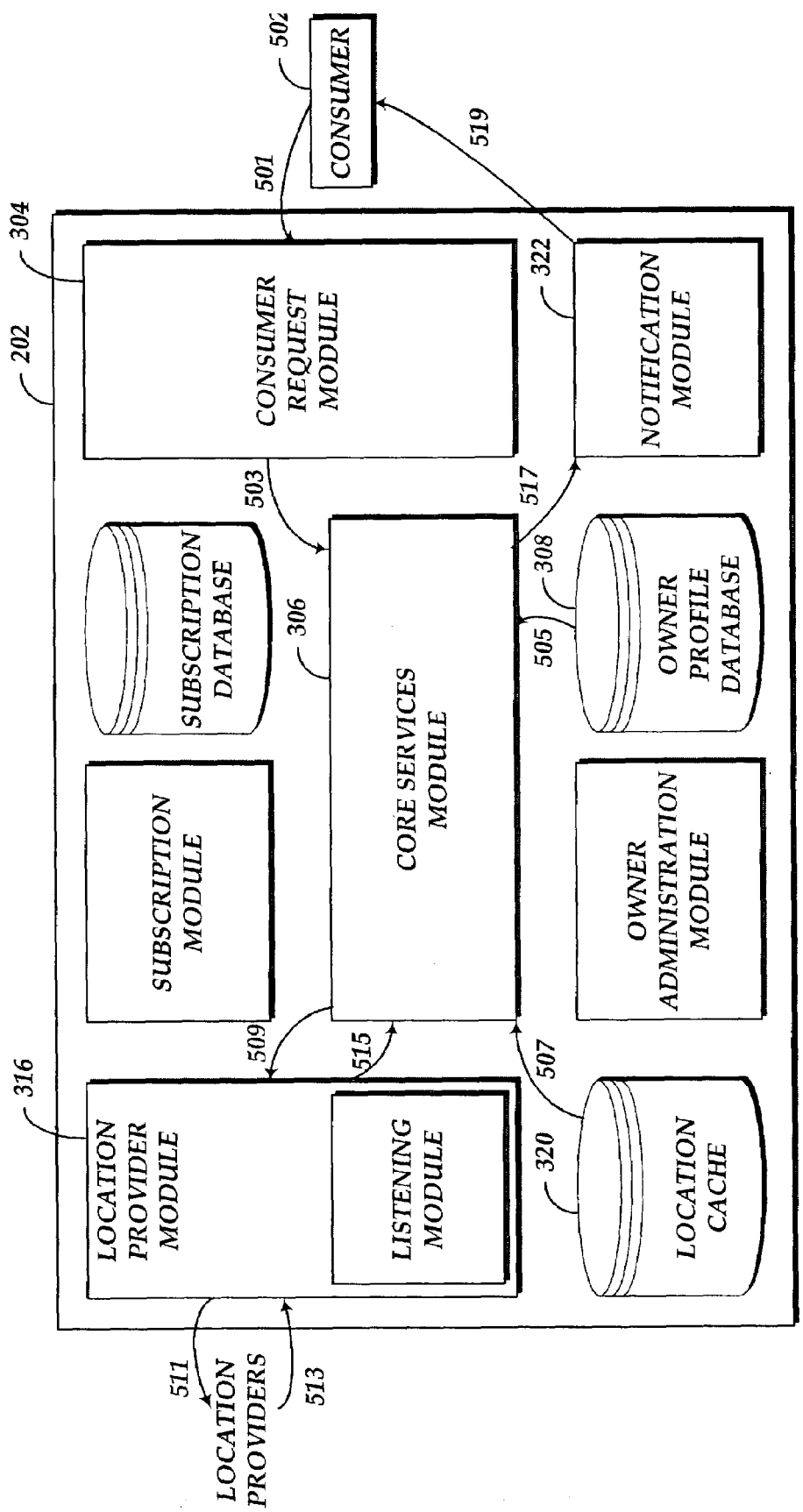
FIG. 5 is a block diagram of the logical components of the location services server of FIG. 3 illustrating the processing of an asynchronous location request from a location consumer.

FIG. 5 is a block diagram of the logical components of the location services server 202 of FIG. 3 illustrating the processing of an asynchronous location request. In the illustrated embodiment of the invention, a location consumer 502 submits the asynchronous location request, illustrated by arrow 501, to the consumer request module 304 of the location services server 202. The consumer request module 304 transfers the asynchronous location request to the core services module 306, as indicated by arrow 503. The core services module 306 retrieves owner profile information from the owner profile database 308 corresponding to the location owner identified in the location request, as described previously in regard to FIG. 4, as indicated by arrow 505.

Because the location request is an asynchronous location request, as described above, the location consumer's 502 process does not immediately require a response. Instead, the location consumer's 502 process initiates an internal process within the location services server 202 to complete the asynchronous request, and then returns. This internal process performs functions similar to those described in regard to FIG. 4, that result in location information being sent to the location consumer 502. In this internal process, the core services module 306 retrieves any location information already stored in the location cache 320, as indicated by arrow 507. For those location providers not having information stored in the location cache 320, the core services module 306 sends information identifying the information owner to the location provider module 316, as shown by arrow 509. The location provider module 316 queries the location providers, as shown by arrow 511. As previously mentioned, the location provider module 316 may receive both synchronous and asynchronous responses from the location providers, shown by arrow 513.

The location provider module 316 transfers the location information from the location providers back to the core services module 306, as shown by arrow 515. The core services module 306 processes the location information obtained from the location providers and generates a single location according to the restrictions and privacy filters identified in the owner profile information already retrieved from the owner profile database 308. The core services module 306 transfers the generated location information to the notification module 322, as shown by arrow 517. The notification module 322 then transmits to the generated location to the location consumer 502, as shown by arrow 519.

Figure 6:
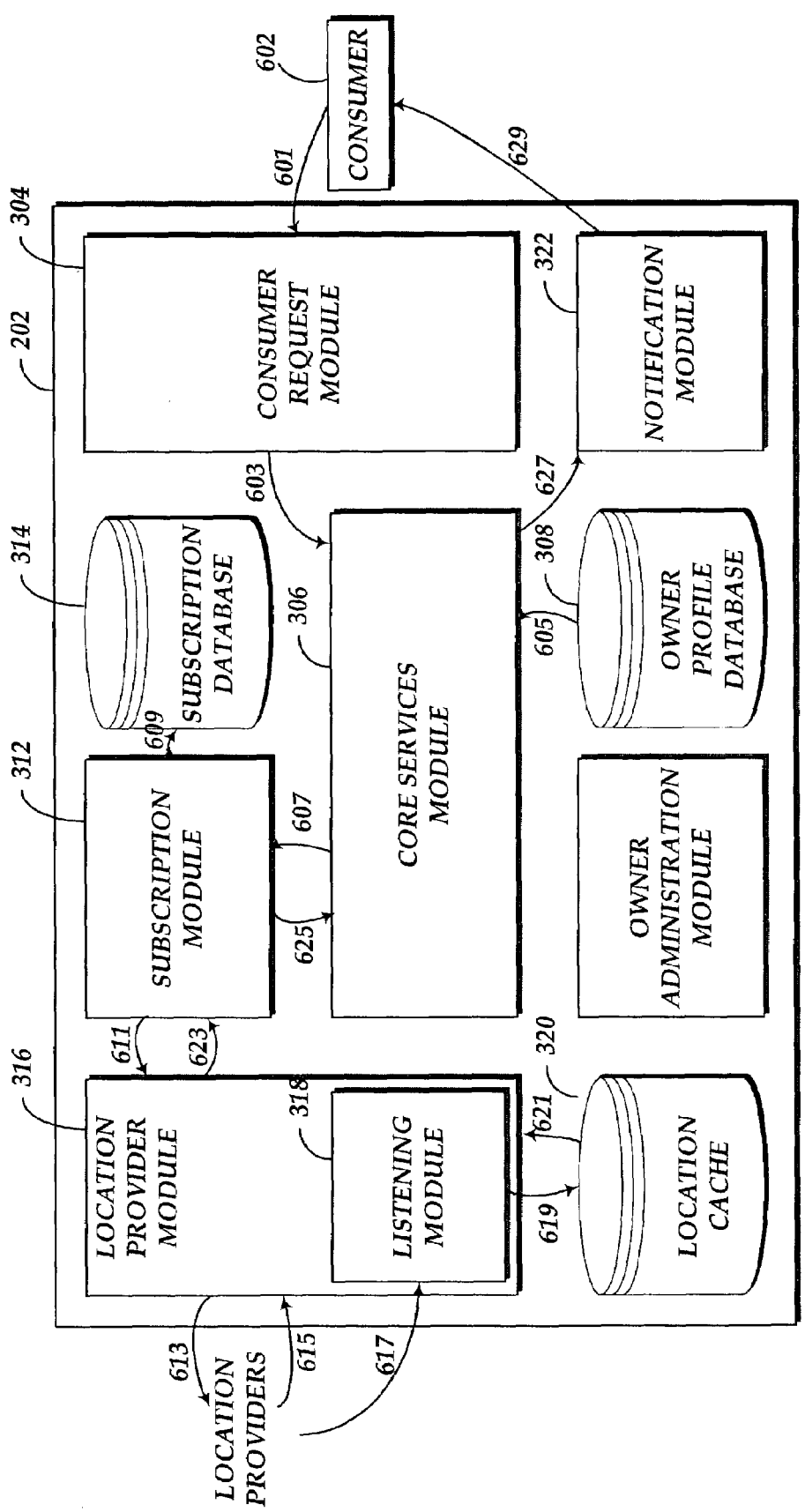
FIG. 6 is a block diagram of the logical components of the location services server of FIG. 3 illustrating the processing of a subscription request from a location consumer.

FIG. 6 is a block diagram of the logical components of the location services server 202 of FIG. 3 illustrating the processing of a subscription request from a location consumer. While FIG. 6 illustrates a particular flow of information between the logical components of a location services server, the flow is for illustration purposes only, and should not be construed as a limitation on the present invention. Those skilled in the art will appreciate that multiple other ways of performing a subscription request fall within the scope of the present invention.

Subscriptions may persist, or remain valid, indefinitely, or for a certain amount of time. Alternatively, they may persist for a specified number of occurrences. Further, subscription requests may identify more than one targeted location owner.

As shown in FIG. 6, a location consumer 602 submits a subscription request to the consumer request module 304 of the location services server, as shown by arrow 601. The consumer request module 304 transfers the request to the core services module 306, as illustrated by arrow 603. A subscription request is similar to an asynchronous location request in that the location consumer's process returns and terminates, as described in regard to FIG. 5. However, a separate process within the location services server 304 is initiated to complete the processing of the subscription request. In this process, the core services module 304 identifies the targeted location owner of the subscription request and retrieves the owner profile information corresponding to the location owner from the owner profile database 308, as shown by arrow 605. Thereafter, the core services module 306 transfers the subscription request to the subscription module 312, as illustrated by arrow 607.

The subscription module 312 receives the subscription request and saves that request in the subscription database 314 for future processing, as shown by arrow 609. The subscription module 312 initializes any processes that need to be completed in order to fulfill the subscription request. These may include timer-based modules, such that after a certain amount of time the location services server will generate a location for the targeted location owner and return that to the location consumer 602. These processes may also include listening modules that listen for location information related to the location owner. Those skilled in the art will appreciate that there may be many other modules needed to process a subscription event that are not enumerated here.

After having generated the appropriate subscription processes, the subscription module 312 transfers to the location provider module 316 identities of the location providers having location information about the targeted location owner, as indicated by arrow 611. The location provider module 316 sends notices to the location providers requesting that they respond with location information for the targeted location owner. As illustrated in this example, the location providers may respond both synchronously to the location provider module 316, as indicated by arrow 615, or alternatively, they may respond asynchronously via the listening module 318, as indicated by arrow 617. If the information is received by the listening module 318, the listening module stores the received location information in the location cache 320, as indicated by arrow 619. The location provider module 316 first retrieves the location information about the location of the location owner already stored in the location cache 320, as shown by arrow 621. The location provider module 316 returns the location information to the subscription module 312, as shown by arrow 623. After receiving the location information, the subscription module 312 processes the information returns it to the core services module 306, as shown by arrow 625. The core services module 306 processes the information according to the privacy restrictions identified in the owner profile information retrieved from the owner profile database 308. The core services module 306 then generates location information responsive to the subscription request and transfers the location information to the notification module 322, as shown by arrow 627. The notification module 322 forwards the location information to the location consumer 602, as shown by arrow 629.

Figure 7:
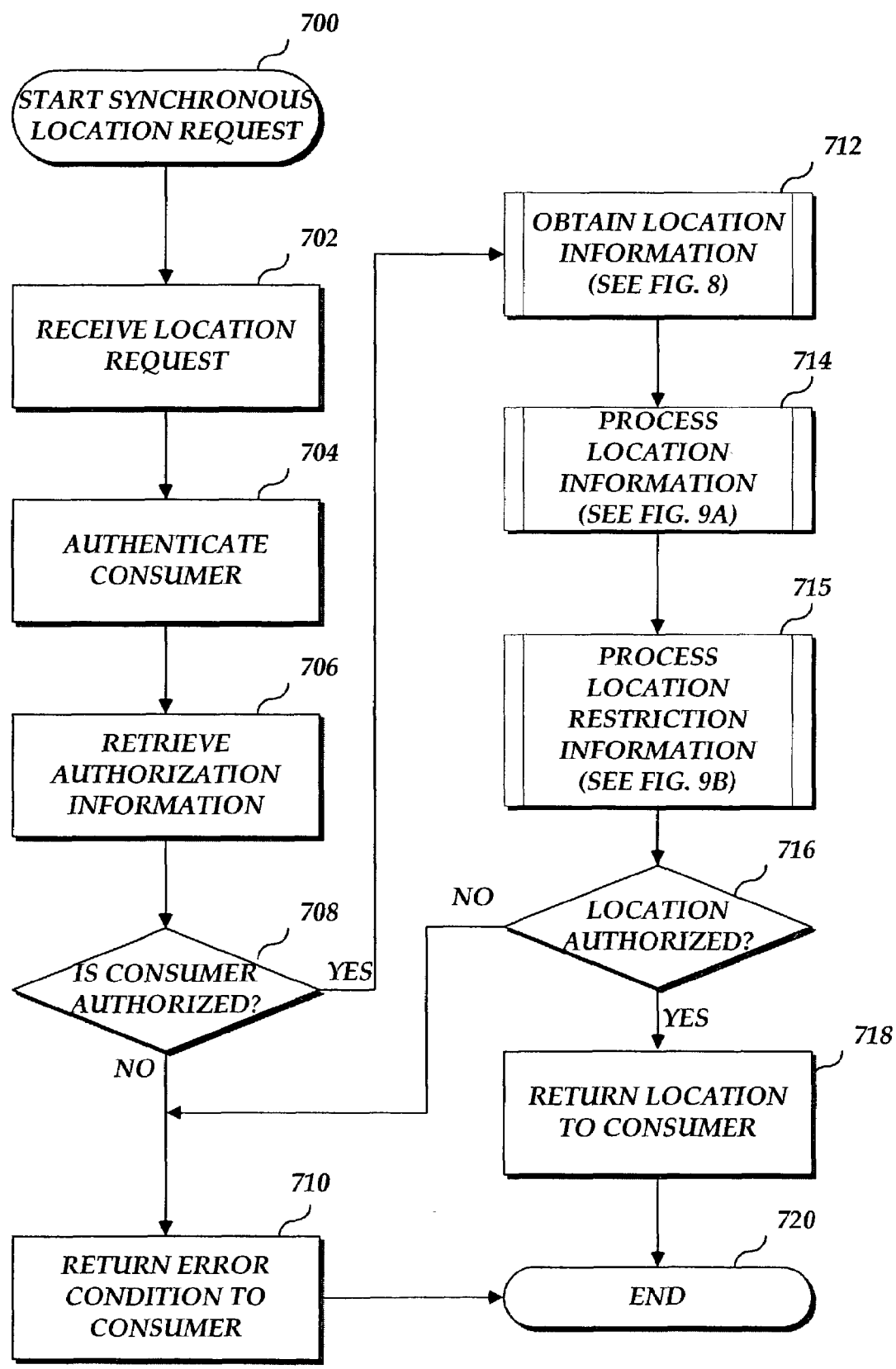
FIG. 7 is a flow diagram illustrative of an exemplary routine implemented by a location services server to process a synchronous location request from a location consumer.

FIG. 7 is a flow diagram of an exemplary routine 700 implemented by a location services server 202 (FIG. 2) for processing a synchronous information request. Beginning at block 702, the location services server 202 receives a location request from a location consumer. At block 704, the location services server 202 attempts to authenticate the requesting location consumer 220. The location services server 202 may utilize a third-party service, such as Microsoft Corporation's Passport.NET authentication service, to authenticate the location consumer 220. Alternatively, the location services server 202 may independently authenticate the requesting location consumer 220 by the use of other authentication methods, such as a generally known login schema, public key ID, or any other like method. The authentication process allows the location services server 202 to positively identify the location consumer 220. Determining the identity of the location consumer is critical to determining whether the location consumer is authorized to access the location owner's location information. As described in more detail below, with respect to decision block 708, if the location consumer fails to properly authenticate himself or herself to the location services server 202, an error condition is returned, and the routine 700 terminates. After having authenticated the location consumer, the routine 700 proceeds to block 706 where the location services server 202 obtains authorization information to determine if the authenticated location consumer is authorized to receive the requested location information. Generally described, process of block 706 retrieves owner profile information, such as a location owner's privacy information, from the owner's profile database 308 (FIG. 3). The location services server 202 then uses the privacy data to determine whether the location consumer is authorized to access the location owner's location information. The location owner can establish any number of broad or narrow parameters in the owner profile that grants authorization to different consumers for different reasons. For example, the authorization in the owner profile information may categorize location consumers, and permit authorization based on categorizations. These categories may include, but are not limited to, consumer friends and consumer services alone, or combined with other parameters, such as the time when a location request is received.

Consumer friends may be defined as individuals the targeted location owner has authorized to access the location information. Consumer friends may include a spouse, family members, friends, employers, and any other identifiable individual the targeted owner authorizes to access the targeted owner's location information. Consumer services may be defined as entities, or individuals, that seek the location owner's location information for commercial purposes.

For both exemplary categories of location consumers, the location owner may specify particular limitations or restrictions on accessing the targeted location owner's location information. For example, the location owner may decide that consumer services should not have access to personal location information once the location owner has quit working for the day. As a consequence, a location owner may restrict all consumer services access to the location owner's location information to normal business hours. Or, the location owner may also restrict the location owner's employer's access to the targeted owner's location information to normal business hours. Alternatively, the location owner may permit the location owner's spouse to have access at all times of the day. At decision block 708, the location services server 202 determines whether, according to authorization restrictions specified by the location owner in the owner profile, the location consumer is authorized to access the requested location information. If the location request is outside of the permission's granted by the location owner, at block 710 the location services server 202 returns an error condition to the location consumer. After returning the error condition to the location consumer, the routine terminates at block 718. Alternatively, if the consumer is properly authorized to access the targeted information, at block 712, the location services server 202 obtains the location owner's location information from the information providers.

Figure 8:
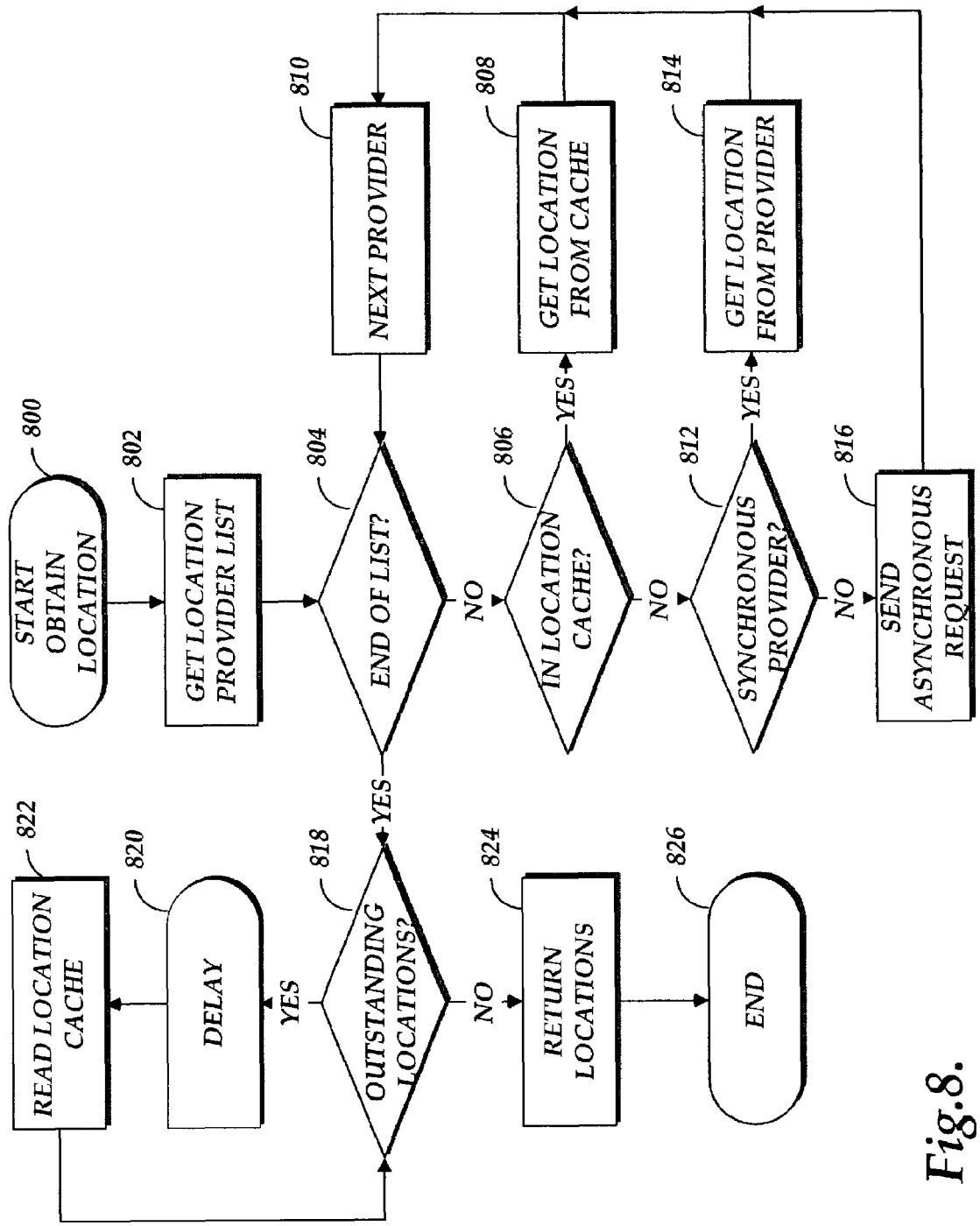
FIG. 8 is a flow diagram illustrative of an exemplary obtain location information subroutine suitable for use in FIG. 7.

FIG. 8 is a flow diagram of an exemplary subroutine 800 implemented by a location services server 202 to obtain location information for a location owner from one or more location providers associated with the location owner. At block 802, the location services server 202 receives a location provider list associated with the location owner. Alternatively, the location services server 202 retrieves the location provider list for the targeted location owner from the owner profile database 308. At decision block 804, the subroutine iterates through each location provider in the location provider list.

At decision block 806, a test is conducted to determine whether the location information from the location provider is already in the location cache 320 (FIG. 3). This typically occurs when the location provider is a push-type provider. If the location is found in the location cache 320, at block 808, the location is retrieved from the location cache 320. At block 810, the subroutine iterates to the next location provider in the location provider list. At decision block 804, the subroutine 800 continues until location information from each remaining location provider in the location provider list has been sent a location request.

If, at decision block 806, the location is not already in the location cache 320, a test is conducted to determine whether the current location provider in the location provider list is a synchronous location provider. See decision block 812. If the location provider is a synchronous location provider, at block 814, the location information from the synchronous location provider is retrieved. Then, as described above, at block 810, the subroutine iterates to the next location provider in the location provider list. Again, at decision block 804, the subroutine 800 continues until location information from each remaining location provider in the location provider list has been sent a location request.

If, at decision block 812, the location provider is not a synchronous location provider, at block 816, a message is sent to the asynchronous location provider requesting location information corresponding to the location owner. Because an asynchronous location provider responds asynchronously, the subroutine 800 does not wait for an immediate reply. Rather, at block 810, the subroutine 800 iterates to the next location provider in the location provider list. The subroutine 800 continues to cycle through decision block 804 until each location provider in the location provider list has been sent a location request, or location information from each location provider has been retrieved from the location cache.

After iterating through the location providers in the location provider list, at decision block 818, a test is made to determine whether any responses from location providers in the location provider list have not yet been received. This typically arises if any asynchronous requests were made. If there are outstanding location provider responses, at delay block 820, the subroutine delays a certain amount of time in order to give the asynchronous location providers a period of time to reply to the location request. At block 822, the location cache 320 is read to determine whether any of the outstanding responses from location providers have been received. Then, looping back to decision block 818, a test is again made to determine whether there are any remaining outstanding responses. Additionally (not shown), the test in decision block 818 may also consider the amount of time elapsed since the location provider module sent the request to the location provider. Preferably, the subroutine proceeds to block 824 after a predetermined amount of time has elapsed in order to prevent a blocking condition. At block 824, after all of the responses from the location providers have been received, the location information from the location providers is returned. At block 826 the subroutine terminates.

Returning back to FIG. 7, at block 714, after having obtained location from all of the location providers for the location owner, the location information is processed according to the authorization constraints specified by the location owner. Preferably, processing the location information generates a single location in response to the location request.

Figure 9A:
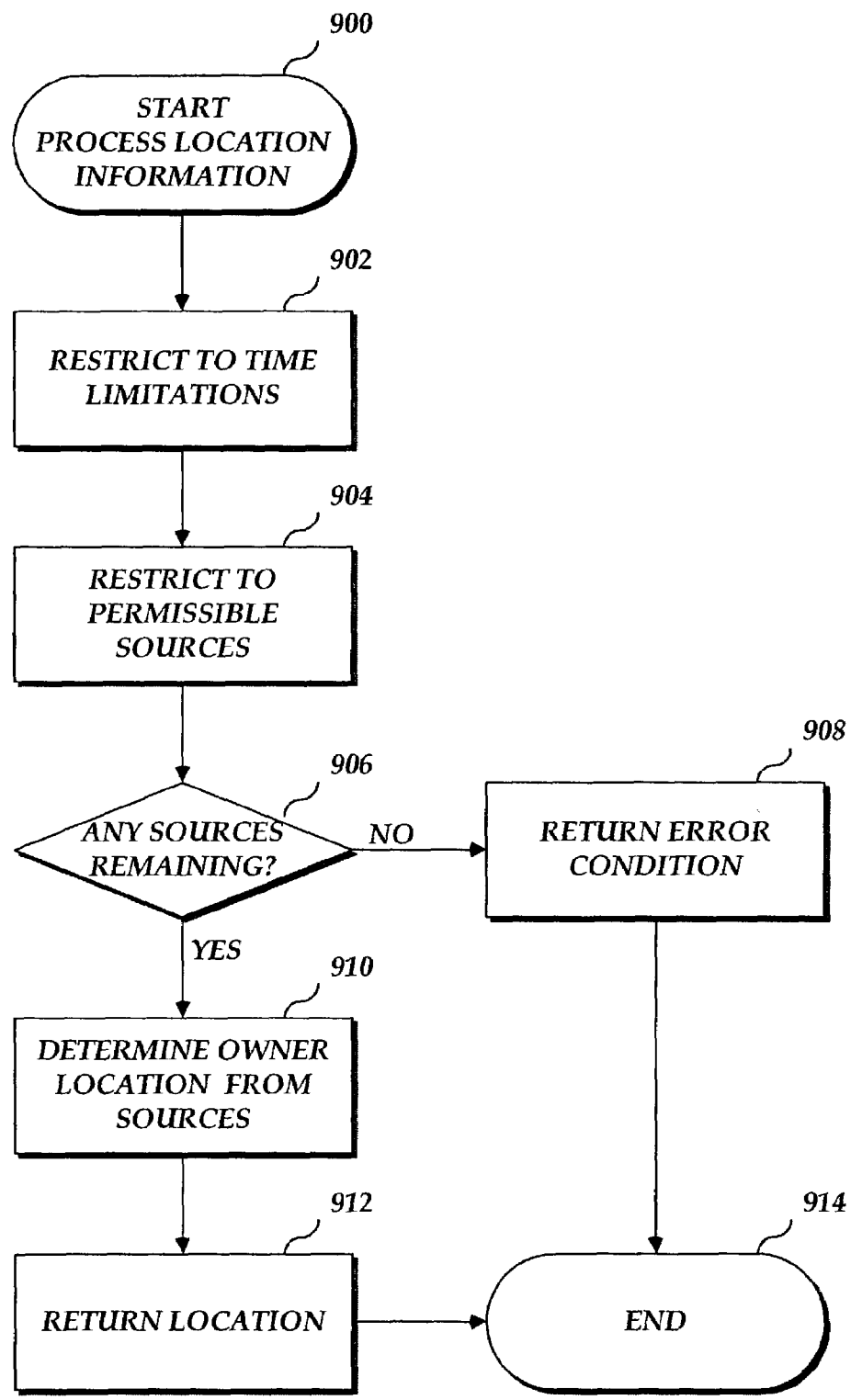
FIG. 9A is a flow diagram illustrative of an exemplary obtain location information subroutine suitable for use in FIG. 7.

FIG. 9A is a flow diagram of a subroutine 900 implemented by a location services server 202 to process one or more locations of a location owner to generate a single location. In the illustrated embodiment of the invention, the location information is processed according to the privacy restrictions established by the location owner and stored in the owner profile information in the owner profile database 308. At block 902, any location information that violates any time-base privacy limitations, as specified by the location owner in the owner profile information, is eliminated from processing. At block 904, any location information from unauthorized location providers, as specified in the location owner profile information as permissible sources for the location consumer, is eliminated from processing. While FIG. 9A illustrates two privacy restrictions, they are intended to be illustrative and not limiting on the invention. Those skilled in the art will appreciate that other privacy restrictions exist and other combinations may be applied. For example, a privacy restriction limiting location information in relation to a particular geographic area may be among the privacy restrictions. At decision block 906, a test is made to determine whether there are any remaining location sources available from which a location may be obtained. If there are no remaining location sources, at block 908 an error condition is returned to the location consumer.

Alternatively, at block 910, the remaining sources of location information are processed to generate a single location for the location consumer in response to the location request. For example, the subroutine 900 may determine the single location according to rankings of the location providers according to a hierarchy previously established by the location owner. Alternatively, the single location may be generated according to resolution information previously established by the location owner. Resolution information permits the location owner to control how precise the location will be. For example, while the information from the location providers may be able to locate the location owner within a few feet, the location owner may wish that location consumers receive only more general location information in response to a request. Alternatively, depending on privacy constraints, the current location may always be a given location. For example, otherwise authorized consumer services may receive a response of "away" during weekend days. In another alternative, the location owner may label certain geographic locations or regions in order to give greater meaning to the location information. For example, an answer such "Building C" may be more meaningful than specific location coordinates. At block 912, the generated location information is returned and the subroutine terminates at block 914. While this description identifies certain criteria for determining a current location from multiple location sources, the criteria are for illustration purposes should not be construed as limiting the invention. Those skilled in the art will recognize that other rules and criteria that may be used to determine a current location from multiple location sources.

Returning to FIG. 7, if, at block 714, an error condition was detected during processing the location sources, an error condition is returned to the location consumer (not shown). After processing the location information to generate a single current location, the routine 700 then proceeds to decision block 715 where the location services server 202 processes location restriction information. Generally described, the process of block 715 involves the processing of a selected geographic area stored in the owner profile database 308 to determine if the requesting location consumer is authorized to receive the location information. A more detailed description of the process of block 715 is described below with reference to FIG. 9B.

Figure 9B:
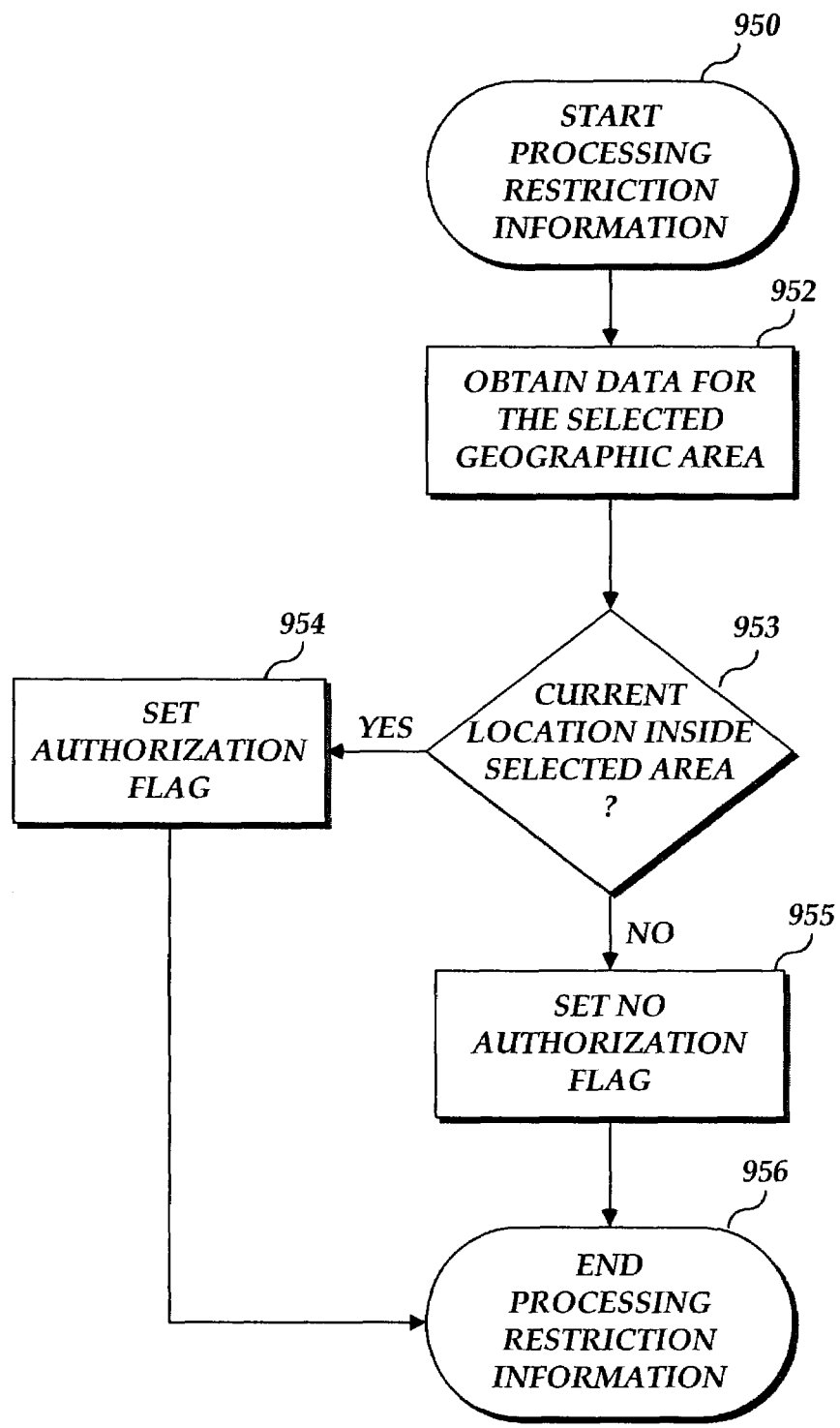
FIG. 9B is a flow diagram illustrative of an exemplary routine for processing geographic restriction information suitable for use in FIG. 7.

FIG. 9B is a flow diagram of a subroutine 950 suitable for use in FIG. 7 to process location restriction information. Generally described, the subroutine 950 examines information that defines the owner-specified geographic restrictions to determine if the requesting location consumer is authorized to receive the owner's location information. The subroutine 950 starts at block 952 where the location services server 202 obtains authorization information describing the selected geographic area from the owner profile database 308.

Once the authorization information is obtained from the owner profile database 308, the routine 950 proceeds to decision block 953 where the location services server 202 examines the generated location information (generated in process block 912 of FIG. 9A) to determine if the generated location information describes a geographic region that coincides with the boundaries that define the selected geographic area.

As illustrated in FIG. 9B, the geographic region coincides with the boundaries of the selected geographic region when the geographic region resides, all or partially, within the boundaries of the selected geographic area. In an alternative embodiment (not shown), the selected geographic area may describe an area within which a location consumer is not authorized to access location information. For example, the location owner may specify in the owner profile database 308 that he does not wish to be tracked while visiting a particular geographic area. In such cases, if the generated location information describes a geographic region that falls within the selected geographic area, the requesting location consumer would be restricted from receiving the location information.

The process of decision block 953 may involve any suitable method of comparing geographic data for determining if a geographic location or data point coincides with a predefined geographic area. As will be appreciated by those skilled in the art, the process of decision block 953 may involve the use of map data, global positioning data, geographic text description data, or any other data or information that describes a geographic area and/or a set of boundaries of a geographic area.

At decision block 953, if the location services server 202 determines that the generated location information coincides with the selected geographic area, the routine 950 proceeds to process block 954 where the server 202 sets a flag in memory to indicate that the requesting location consumer is authorized to receive the generated information. However, at decision block 953, if the location services server 202 determines that the generated location information does not coincide with the selected geographic area, the routine 950 proceeds to block 955 where the location services server 202 sets a flag in memory to indicate that the requesting location consumer is restricted from receiving the location information. Then the process location restriction information subroutine 950 returns to the calling routine 700 (FIG. 7).

Figure 10:
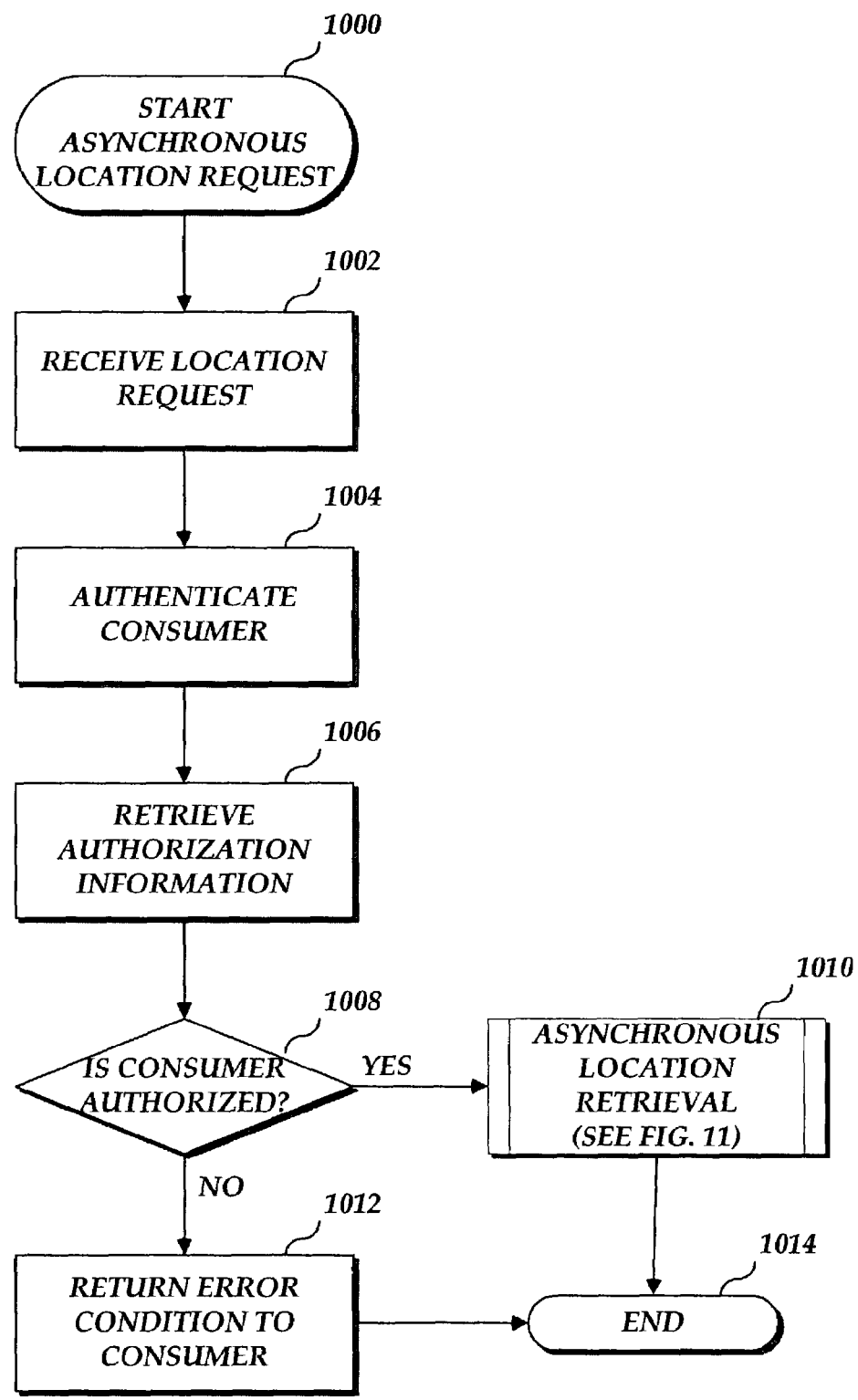
FIG. 10 is a flow diagram illustrative of an exemplary routine implemented by the location services server to receive and process an asynchronous location request from a location consumer.

Returning again to FIG. 7, after the processing of the location restriction at block 715, the routine 700 proceeds to decision block 716 where the location services server 202 determines if the requesting location consumer is authorized to receive the generated location information. The process of decision block 716 may involve the examination of one or more memory flags, such as those established in process blocks 954 and 955 of FIG. 9B. At decision block 716, if the server 202 determines that the requesting location consumer is not authorized to receive the generated current location, the routine 700 proceeds to block 710 where the server 202 returns an error code to the location consumer. After the error code is returned to the location consumer, the routine 700 terminates at process block 720. However, at decision block 716, if the server 202 determines that the requesting location consumer is authorized to receive the generated current location, the routine 700 proceeds to block 718 where the server 202 returns the generated location information to the location consumer 220. The routine 700 then terminates at block 720. FIG. 10 is a flow diagram of an exemplary routine 1000 implemented by the location services server 202 to receive and process an asynchronous location request from a location consumer. At block 1002, the location services server 202 receives the location request from a location consumer. At block 1004, the location services server 202 authenticates the location consumer that submitted the location request, as previously described in relation to FIG. 7 (block 704). After authenticating the location consumer, at block 1006, the location services server 202 retrieves authorization information included in the owner profile information corresponding to the targeted location owner from the owner profile database 308, also previously described in relation to FIG. 7 (block 706).

After retrieving the authorization information for the targeted location owner, at block 1008, a test is made to determine whether the location consumer is authorized to make the location request, as described above in regard to FIG. 7 (block 708). If the location consumer is not authorized, or does not have the necessary permissions to make the location request, at block 1012, an error condition is returned to the location consumer. Alternatively, if the location consumer is authorized to request the location owner's location information, at block 1010, an asynchronous location retrieval subroutine is initiated. In contrast to the synchronous location request described in FIG. 7, an asynchronous location request initiates a separate asynchronous location retrieval subroutine and then terminates the current routine, thus freeing the location consumer from waiting for a response to the location request. While this method describes certain steps prior to termination, they are to be construed as illustrative and not limiting. Those skilled in the art will recognize that more or fewer steps may be taken prior to terminating the asynchronous location request without departing from the scope of the present invention. At block 1014 the routine terminates.

Figure 11:
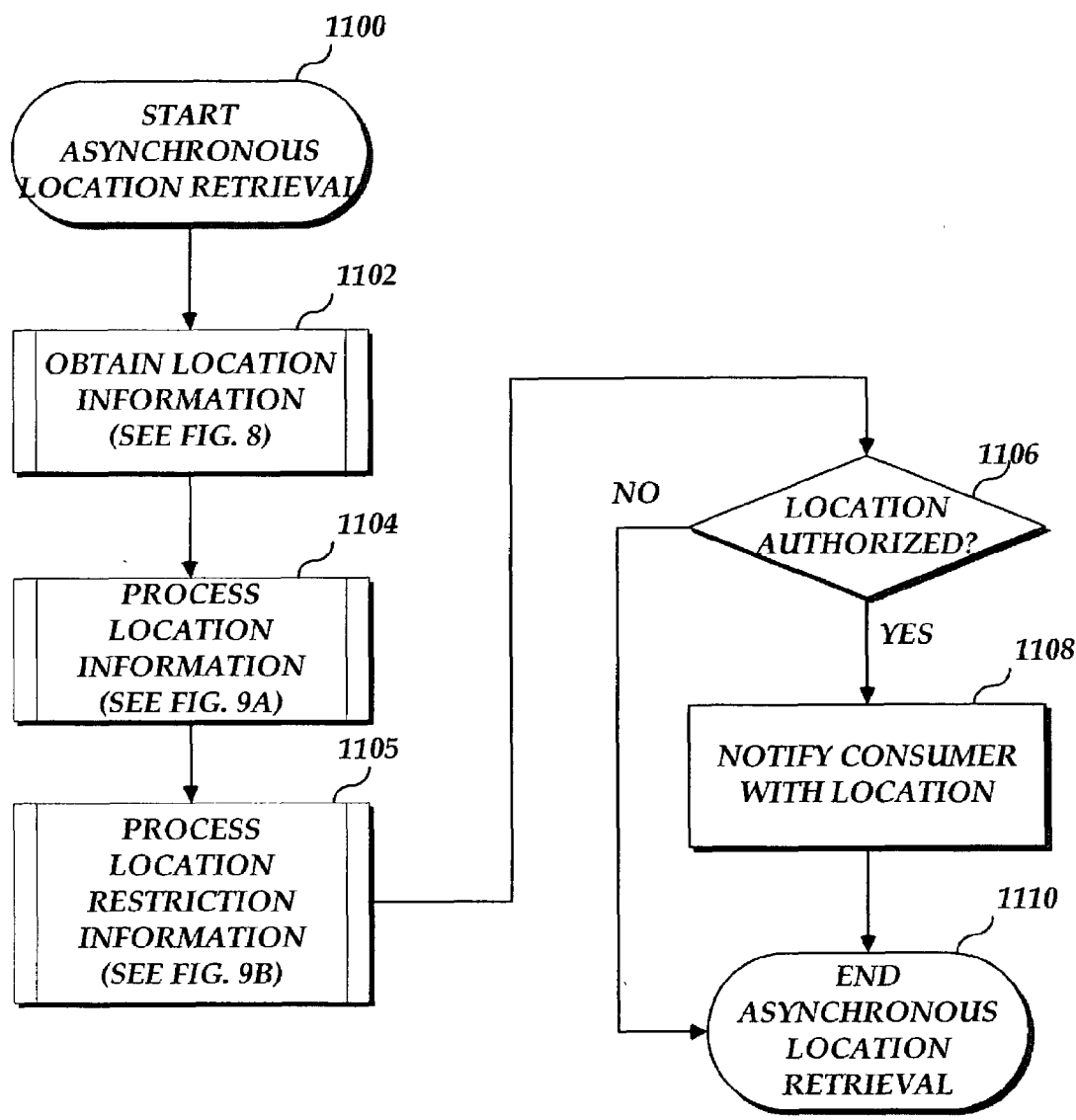
FIG. 11 is a flow diagram illustrative of an exemplary asynchronous location retrieval subroutine suitable for use in FIG. 10.

FIG. 11 is a flow diagram of an exemplary subroutine 1100 for processing an asynchronous location request from a location consumer. At block 1102, the asynchronous location retrieval method obtains location information. Since an illustrative subroutine for obtaining location information is described above in relation to FIG. 8, such a subroutine is not described again here. After having retrieved the location information from the location providers, at block 1104, the retrieved location information is processed to generate a single location. Since an illustrative subroutine for processing the location information retrieved from location providers is described above in relation to FIG. 9A, such a subroutine is not described again here. After generating the location information, the subroutine 1100 continues to block 1105 where the location services server 202 processes location restriction information. As described more fully above with respect to FIG. 9B, the process of block 1105 involves the examination of the selected geographic area stored in the owner profile database 308 to determine if the requesting location consumer is authorized to receive the location information.

After the processing of the location restriction at block 1105, the routine 1100 proceeds to decision block 1106 where the location services server 202 determines if the requesting location consumer is authorized to receive the generated location information. As described above with reference to block 716 of FIG. 7, the process of decision block 1106 may involve the examination of one or more memory flags, such as those established in process blocks 954 and 955 of FIG. 9B. At decision block 1106, if the server 202 determines that the requesting location consumer is not authorized to receive the generated current location, the routine 1100 proceeds to block 1110 where the routine 1100 terminates. However, at decision block 1106, if the server 202 determines that the requesting location consumer is authorized to receive the generated current location, the routine 1100 proceeds to block 1108 where the server 202 notifies the location consumer 220 with the generated location information. The routine 1100 then terminates at block 1110.

Figure 12:
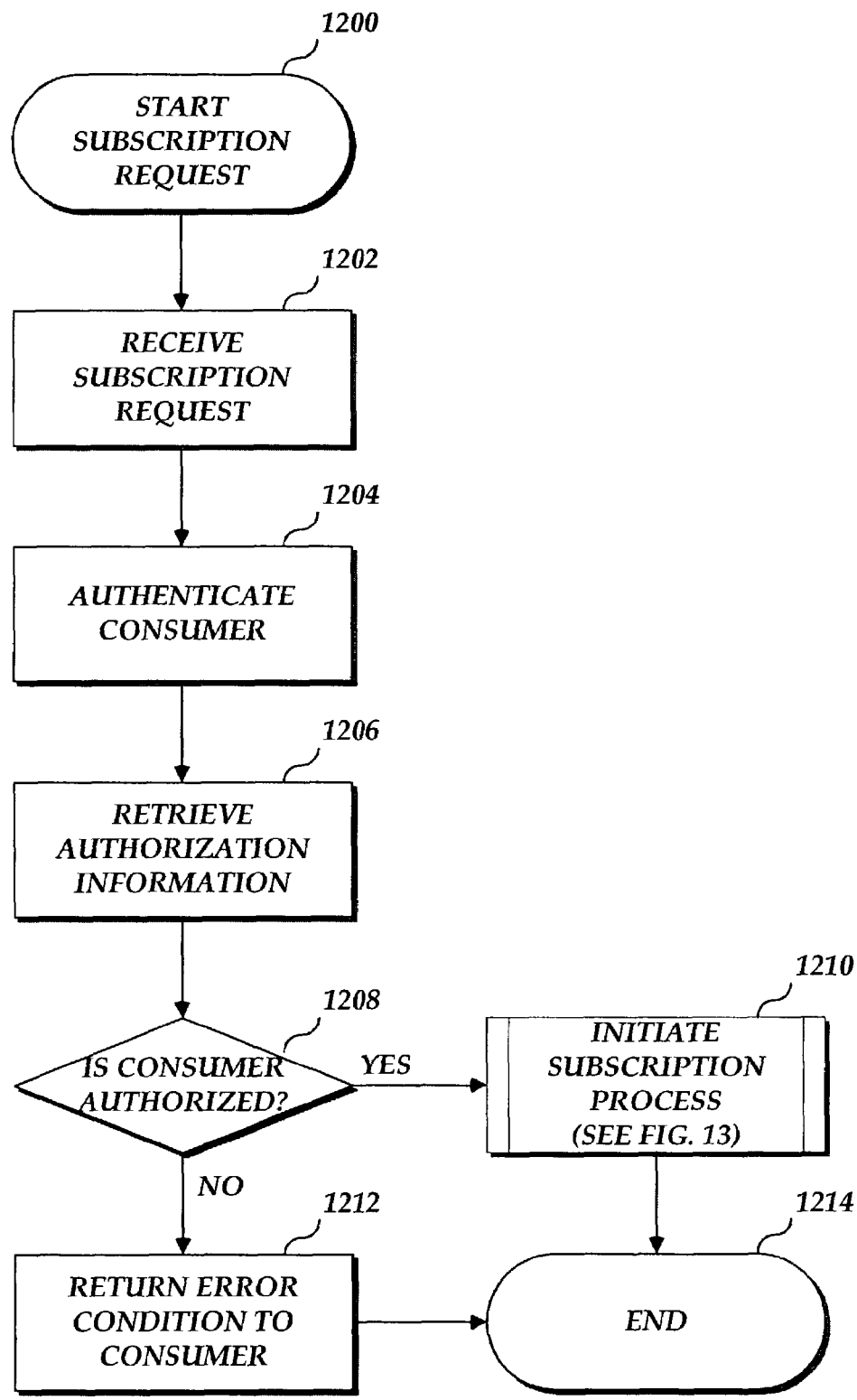
FIG. 12 is a flow diagram illustrative of an exemplary routine for receiving and initiating a location subscription request from a location consumer.

FIG. 12 is a flow diagram of an exemplary routine 1200 for receiving and processing a location subscription request received from a location consumer. While a synchronous and an asynchronous location request require that the location services server provide a single location in response to the request, a subscription request is typically a request to continually receive updates from the location services server concerning the location of the targeted location owner. Beginning at block 1202, the information services server 202 receives a subscription request from a location consumer. At block 1204, the location consumer is authenticated, as previously described in relation to FIG. 7. After having authenticated the location consumer, at block 1206, the method commences an authorization process by retrieving authorization information for the location owner from the owner profile database 308, also previously described in relation to FIG. 7.

At decision block 1208, a test is made to determine whether the location consumer is authorized to subscribe to the targeted location owner. If the location consumer is not authorized to subscribe to the location owner according to the authorization information retrieved, at block 212, an error condition is returned to the location consumer. Alternatively, if the location consumer is authorized to subscribe to the location owner's location information, at block 1210, a subscription process is initiated. At block 1214 the routine terminates. Those skilled in the art will recognize that more or fewer steps may be taken prior to terminating the subscription request without departing from the scope of the invention.

Figure 13:
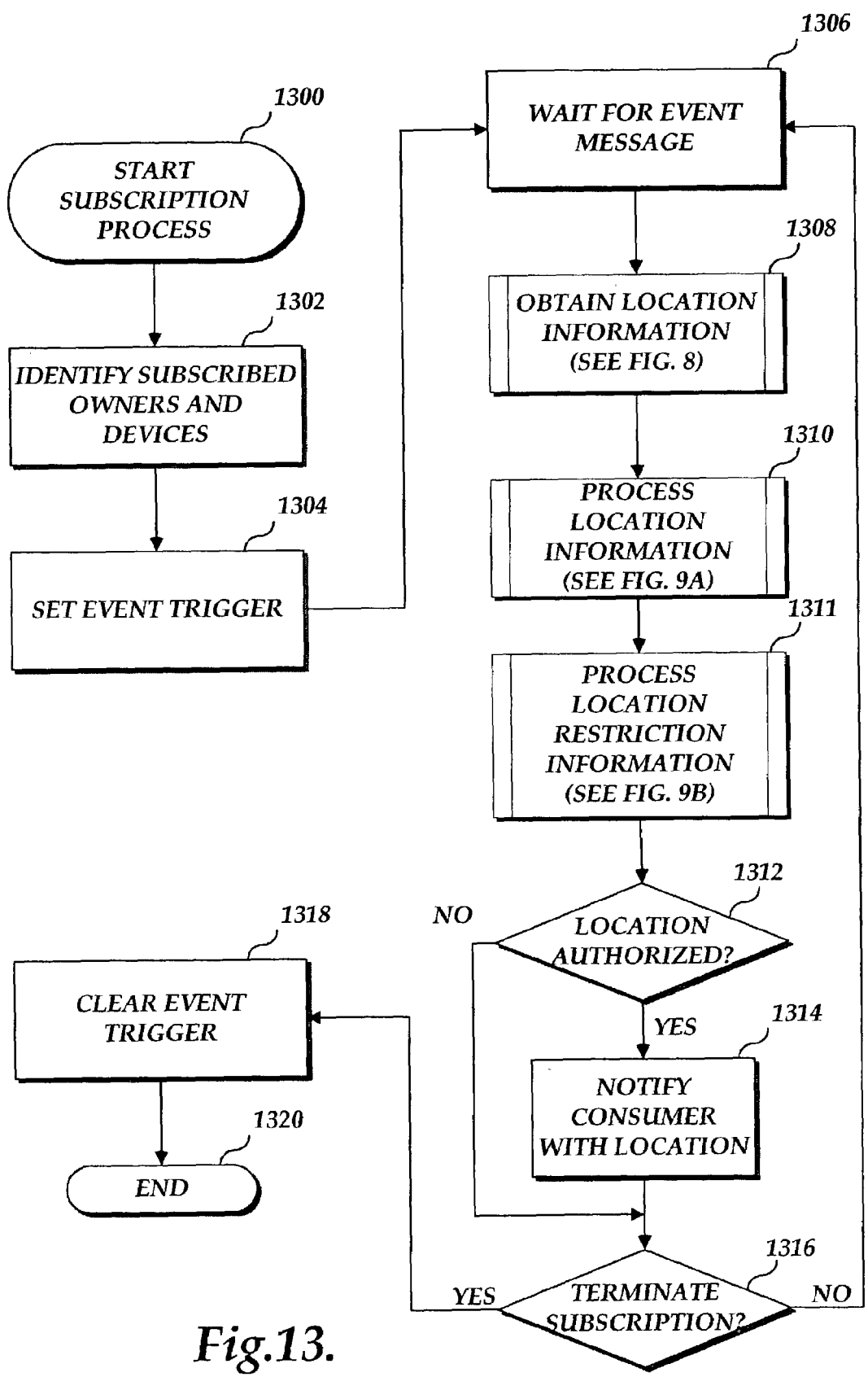
FIG. 13 is a flow diagram illustrative of an exemplary intake subscription process subroutine suitable for use in FIG. 12.

FIG. 13 is a flow diagram of an exemplary subroutine 1300 of a subscription process suitable for use in of FIG. 12 (block 1210). Beginning at block 1302, the subscription process identifies the subscribed location owner and associated location providers. A subscription request can designate more than one subscribed owner. Or, a subscription request must designate one location owner for each subscription request. Alternatively, other criteria may be used after identifying the subscribed owner and associated location providers, at block 1304, the subscription process creates event triggers.

Event triggers are processes that monitor certain information according to a subscribed event, and generate, or "trigger", an event message when the subscribed event occurs. For example, a subscribed event may be a timer event such that an event trigger generates an event message after a certain amount of time, identified in the timer event, expires. As another example, a subscribed event may be a geographic area event such that an event trigger generates an event message when the location owner's location information changes with respect to a particular geographic location. The location services server 202 notifies the location providers of the subscribed event, so that the location providers will able to provide the necessary notification when the subscribed event occurs.

At block 1306, the subscription process waits for an event message, indicating that the subscribed event has occurred. At block 1308, the location services server 202 obtains location information from the location providers corresponding to the location owner. Location information may be obtained in the manner previously described with regard to FIG. 8. Next, at block 1310, the location services server 202 processes the location information retrieved from the location providers to generate a single location. Preferably, the retrieved location information is processed in the manner previously described in relation to FIG. 9A. After generating the location information, the subroutine 1300 proceeds to block 1311 where the location services server 202 processes the location owner's restriction data in the owner profile database 308 to determine if the requesting location consumer is authorized to receive the generated location information. Preferably, the location restriction data is processed in the manner previously described in relation to FIG. 9B.

The subroutine 1300 proceeds to decision block 1312 where the server 202 determines if the requesting location consumer is authorized to receive the generated location information. The process of decision block 1312 may involve the examination of one or more memory flags, such as those established in process blocks 954 and 955 of FIG. 9B. At decision block 1312, if the server 202 determines that the requesting location consumer is not authorized to receive the generated current location, the subroutine 1300 proceeds to decision block 1316 where the location services server 202 then determines whether to terminate the subscription process. However, if at decision block 1312 the location services server 202 determines that the requesting location consumer is authorized to receive the generated current location, the subroutine 1300 proceeds to block 1314 where the location consumer is notified of the generated location information according to the subscription request. After the location consumer is notified of the generated location information, the subroutine 1300 proceeds to decision block 1316 where the location services server 202 determines whether to terminate the subscription process.

As noted above, at decision block 1316, the location services server 202 determines whether to terminate the subscription process. The determination at decision block 1316 may be based on termination information provided the in the subscription request. Alternatively, the determination may be based on internal predetermined values. The termination information may include, but is not limited to, expiration dates, and frequency of subscribed event processing. Alternatively, the location consumer may issue a request to terminate the subscription request. Or, the location owner may cause the subscription request to be terminated. Those skilled in the art will appreciate that there are other mechanisms may be used to terminate the subscription request which, although not described, fall within the scope of the invention. At block 1306, if the subscription process is not to be terminated, the subscription process waits for another event message. Alternatively, if the subscription process is to be terminated, at block 1318, the subscription process clears any remaining event triggers. Termination may include notifying the location providers of the termination of the subscription request. At block 1320 the subscription subroutine 1300 terminates.

While various embodiments of the invention have been illustrated and described, it will be appreciated that various changes can be made therein without departing from the spirit and scope of the invention as defined by the appended claims.

The embodiments of the invention in which an exclusive property or privilege is claimed are defined as follows:

1. A computer system for providing information about the location of location owners to a location consumer in response to the receipt of a location request from said location consumer comprising:
   (a) data storage for storing a location owner profile information being used for controlling access to information about the location of the associated location owner ("location information"), the location owner profile information including data describing a selected geographic area; and
   (b) a data processing system for:
      (i) receiving requests from location consumers for information about the location of location owners;
      (ii) in response to the receipt of a request from a location consumer for location information, obtaining the location owner profile information from said data storage associated with said location owner, the location owner profile information including the data describing the selected geographic area;
      (iii) obtaining from at least one location provider information about the location of said location owner;
      (iv) processing the information provided by the location provider about the location of said location owner in accordance with said location owner profile information obtained from said data storage;
      (v) determining if the location consumer is authorized to receive the location information, the authorization being based on an examination of the processed location information and the selected geographic area; and
      (vi) if it is determined that the location consumer is authorized to receive the location information, transmitting the result of said processing of the information provided by the location provider to said location consumer requesting information about the location of said location owner.

2. The computer system of claim 1, wherein determining if the location consumer is authorized to receive the location information comprises:
   determining if a geographic location described in the processed location information falls within a set of boundaries that define the selected geographic area; and
   if the geographic location described in the processed location information falls within the set of boundaries defined in the selected geographic area, determining that the location consumer is authorized to receive the location information.

3. The computer system of claim 1, wherein the selected geographic area comprises a plurality of discrete geographic areas.

4. The computer system of claim 1, wherein the selected geographic area is defined by the location owner.

5. The computer system of claim 1, wherein determining if a geographic location described in the processed location information falls within a set of boundaries that define a plurality of selected geographic areas.

6. The computer system of claim 1, wherein determining if the location consumer is authorized to receive the location information comprises:
   determining if a geographic location described in the processed location information falls within a set of boundaries defined in the selected geographic area; and
   if the geographic location described in the processed location information falls within the set of boundaries that define the selected geographic area, transmitting the result of said processing of the information provided by the location provider to said location consumer requesting information about the location of said location owner.

7. The computer system of claim 1, wherein the selected geographic area comprises a plurality of discrete geographic areas.

8. The computer system of claim 1, wherein the data processing system allows the location owner to modify the data describing the selected geographic area.

9. The computer system of claim 1, wherein the location owner profile associates a data set describing a unique selected geographic area with individual location consumers.

10. The computer system of claim 1 wherein:
    (a) the location owner profile information also includes data describing a time period during which the location consumer is authorized to access location information;
    (b) the data processing system also determines if a time associated with the request corresponds with the time period during which the location consumer is authorized to access location information; and
    (c) the result of said processing of the information provided by the location provider are transmitted to said location consumer requesting information about the location of said location owner only if it is determined that the time associated with the request corresponds with the time period during which the location consumer is authorized to access information about the location of the location owner.

11. The computer system of claim 10, wherein determining if a time associated with the request corresponds with the time period during which the location owner is authorized to access location information comprises:
    obtaining the time when the request was received from a location owner for location information;
    obtaining authorization data from the owner profile, the authorization data including the time period during which the location consumer is authorized to access the location information;
    determining if the time when the request was received from a location owner for location information falls within the time period during which the location consumer is authorized to access the location information; and
    if the time when the request was received from a location owner falls within the time period during which the location consumer is authorized to access the location information, transmitting the result of said processing of the information provided by the location provider to said location consumer requesting information about the location of said location owner.

12. The computer system of claim 11, wherein the authorization data describes a plurality of time periods during which the location consumer is authorized to access location information.

13. A method of providing information about the location of a location owner to a location consumer in response to the receipt of a location request produced by the location consumer, comprising:
    (a) in response to receiving a location request from a location consumer for information about the location of a location owner, obtaining an owner profile associated with the location owner, the owner profile including data describing a selected geographic area;
    (b) obtaining information about the location of the location owner from a location provider;
    (c) processing the obtained information about the location of the location owner in accordance with the owner profile to generate data indicative of a current location of the location owner;
    (d) using the data describing the selected geographic area and the data indicative of a current location to determine whether the location consumer is authorized to receive information about the location of the location owner; and
    (e) if the location consumer is authorized to receive the data indicative of the current location, transmitting the data indicative of the current location of the location owner to the location consumer.

14. The method of claim 13, further comprising transmitting an error message to the location consumer if the location consumer is not authorized to receive information about the location of the location owner.

15. The method of claim 13, wherein determining if the location consumer is authorized to receive the location information comprises:
    determining if a geographic location described in the processed location information falls within a set of boundaries that define the selected geographic area; and
    if the geographic location described in the processed location information falls within the set of boundaries defined in the selected geographic area, determining that the location consumer is authorized to receive the location information.

16. The method of claim 13, wherein the selected geographic area is defined by the location owner.

17. The method of claim 13, wherein the selected geographic area comprises a combination of a plurality of discrete geographic areas.

18. The method of claim 17, wherein determining if the location consumer is authorized to receive the location information comprises:
    determining if a geographic location described in the processed location information falls within a set of boundaries that define the selected geographic area; and
    if the geographic location described in the processed location information falls within the set of boundaries defined in the selected geographic area, determining that the location consumer is authorized to receive the location information.

19. The method of claim 13, wherein in the owner profile also includes data describing a time period during which the location consumer is authorized to access information about the location of the location owner and wherein the method also includes:
    (a) using the time period during which the location consumer is authorized to access information about the location of the location owner to determine whether the location consumer is authorized to receive information about the location of the location owner; and
    (b) transmitting data indicative of the current location of the location owner to the location consumer only if location consumer is authorized to receive information about the location of the location owner based on the time period during which the location consumer is authorized to receive information about the location of the location consumer.

20. The method of claim 19, wherein using the time period during which the location consumer is authorized to access location information to determine whether the location consumer is authorized to receive information about the location of the location owner comprises:

obtaining the time when the request was received from a location owner for location information;

obtaining authorization data from the owner profile, the authorization data including the time period during which the location consumer is authorized to access the location information;

determining if the time when the request was received from a location owner for location information falls within the time period during which the location consumer is authorized to access the location information; and if the time when the request was received from a location owner falls within the time period during which the location consumer is authorized to access the location information, transmitting the result of said processing of the information provided by the location provider to said location consumer requesting information about the location of said location owner.

21. The method of claim 20, wherein the owner profile describes a plurality of time periods during which the location consumer is authorized to access location information.

22. A computer-readable medium having computer-readable instructions for performing the method recited in claim 13.

23. A computer-readable medium having computer-readable instructions for performing the method recited in claim 16.

24. A computer-readable medium having computer-readable instructions for performing the method recited in claim 19.

25. A computer system having a memory, a processor, and an operating environment and for performing the method recited in claim 13.

26. A computer system having a memory, a processor, and an operating environment and for performing the method recited in claim 16.

27. A computer system having a memory, a processor, and an operating environment and for performing the method recited in claim 19.

28. A computer system for providing information about the location of location owners to a location consumer in response to the receipt of a location request from said location consumer comprising:

(a) data storage for storing a location owner profile information being used for controlling access to information about the location of the associated location owner ("location information"), the location owner profile information including data describing a selected geographic area and data describing a time period during which the location consumer is authorized to access location information; and (b) a data processing system for:
  (i) receiving requests from location consumers for information about the location of location owners;
  (ii) in response to the receipt of a request from a location consumer for location information, obtaining the location owner profile information from said data storage associated with said location owner, the location owner profile information including the data describing the selected geographic area and the data describing a time period during which the location consumer is authorized to access location information;
  (iii) obtaining from at least one location provider information about the location of said location owner;
  (iv) processing the information provided by the location provider about the location of said location owner in accordance with said location owner profile information obtained from said data storage;
  (v) determining if the location consumer is authorized to receive the location information, the authorization being based on an examination of the processed location information, the selected geographic area and the time period during which the location consumer is authorized to access location information; and
  (vi) if it is determined that the location consumer is authorized to access information about the location of the location owner, transmitting the result of said processing of the information provided by the location provider to said location consumer requesting information about the location of said location owner.

29. The computer system of claim 28, wherein determining if the location owner is authorized to receive the location information comprises:

obtaining the time when the request was received from a location owner for location information;

determining if a geographic location described in the processed location information falls within a set of boundaries that define the selected geographic area;

determining if the time when the request was received from a location owner for location information falls within the time period during which the location consumer is authorized to access the location information; and if the time when the request was received from a location owner falls within the time period during which the location consumer is authorized to access the location information, and if the geographic location described in the processed location information falls within a set of boundaries defined in the selected geographic area, transmitting the result of said processing of the information provided by the location provider to said location consumer requesting information about the location of said location owner.

* * * * *